(12) United States Patent
Igarashi

(10) Patent No.: US 11,943,339 B2
(45) Date of Patent: Mar. 26, 2024

(54) INFORMATION PROCESSING APPARATUS, INFORMATION PROCESSING METHOD, AND PROGRAM

(71) Applicant: SONY GROUP CORPORATION, Tokyo (JP)

(72) Inventor: Tatsuya Igarashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 295 days.

(21) Appl. No.: 17/430,817

(22) PCT Filed: Jan. 21, 2020

(86) PCT No.: PCT/JP2020/001801
§ 371 (c)(1),
(2) Date: Aug. 13, 2021

(87) PCT Pub. No.: WO2020/170685
PCT Pub. Date: Aug. 27, 2020

(65) Prior Publication Data
US 2022/0166609 A1 May 26, 2022

(30) Foreign Application Priority Data
Feb. 22, 2019 (JP) .................................. 2019-030632

(51) Int. Cl.
*H04L 9/08* (2006.01)
*H04L 9/32* (2006.01)

(52) U.S. Cl.
CPC .......... *H04L 9/0825* (2013.01); *H04L 9/0838* (2013.01); *H04L 9/3236* (2013.01); *H04L 9/3247* (2013.01)

(58) Field of Classification Search
CPC ... H04L 9/0825; H04L 9/0838; H04L 9/3236; H04L 9/3247; H04L 63/126; H04L 9/3268; H04L 9/0861; H04L 9/3239; G06F 21/64
See application file for complete search history.

(56) References Cited

U.S. PATENT DOCUMENTS

2005/0188207 A1   8/2005   Fujimoto et al.
2009/0164526 A1   6/2009   Hayashi
(Continued)

FOREIGN PATENT DOCUMENTS

CN   1645442 A   7/2005
JP   2005-210277 A   8/2005
(Continued)

OTHER PUBLICATIONS

International Search Report and Written Opinion of PCT Application No. PCT/JP2020/001801, dated Apr. 7, 2020, 08 pages of ISRWO.

*Primary Examiner* — Mohammad W Reza
(74) *Attorney, Agent, or Firm* — CHIP LAW GROUP

(57) ABSTRACT

There is provided an information processing apparatus including a key generating section that generates a public key and a private key of second data generated on the basis of at least one or more pieces of first data; a certificate generating section that generates a certificate by using a private key of the first data to give an electronic signature to the public key of the second data or an ID that is generated by using the public key of the second data and can identify the public key of the second data, and to the second data or data generated from the second data; and a trace data processing section that adds, to the second data, the private key of the second data and trace data to be used for tracing a relation between the first data and the second data. The
(Continued)

trace data includes the certificate generated by the certificate generating section and trace data added to the first data.

16 Claims, 35 Drawing Sheets

(56) References Cited

U.S. PATENT DOCUMENTS

| | | | |
|---|---|---|---|
| 2019/0260594 A1* | 8/2019 | Singhal | .................. H04L 63/06 |
| 2023/0206229 A1* | 6/2023 | Barski | ................. G06Q 20/401 |
| | | | 705/26.41 |

FOREIGN PATENT DOCUMENTS

| | | |
|---|---|---|
| JP | 2008-124668 A | 5/2008 |
| JP | 2010050760 A | 3/2010 |
| JP | 2018-117287 A | 7/2018 |
| WO | WO-2009028513 A1 | 3/2009 |
| WO | 2018/207424 A1 | 11/2018 |

* cited by examiner

FIG.10

| Field | Length | Description |
|---|---|---|
| Data Info | N | — |
| Trace Info | N | — |
| Private Key | 33 | — |

FIG.11

| Field | Length | Description |
|---|---|---|
| Data Type | 3 | DATA FORMAT (E.G. JPG) |
| Number of Hashes | 1 | NUMBER OF Hash VALUES |
| Hash 1 | 32 | Hash VALUE OF Data Area 1 |
| Hash 2 | 32 | Hash VALUE OF Data Area 2 |
| ⋮ | | |
| Hash N | 32 | Hash VALUE OF Data Area N |

F I G. 12

| Field | Length | Description |
|---|---|---|
| Length of TraceInfo | 2 | DATA LENGTH |
| ID | 32 | IDENTIFIER OF DATA. HMAC-SHA256 (Msg, Key) Msg=PublicKey+ParentsHash, Key=DataHash(msg concatenate of Hash1,2, ..., N in DataInfo |
| DigestInfo | N | DIGEST INFORMATION OF DATA |
| PublicKey | 32 | PUBLIC KEY |
| ParentsHash | 32 | HASH VALUE OF MESSAGE FORMED BY LINKING IDs OF PARENT DATA (HASH VALUE OF PUBLIC KEY OF GENERATING APPARATUS IN CASE OF ORIGINAL DATA) |
| Number of Parents | 2 | NUMBER OF PIECES OF PARENT DATA |
| Signature 1 | 64 | SIGNATURE GIVEN TO MESSAGE (ID+PublicKey+DigestHash) BY USING PRIVATE KEY OF Parent1 |
| TraceInfo 1 | N | TraceInfo OF Parent1 |
| Signature 2 | 64 | SIGNATURE GIVEN BY USING PRIVATE KEY OF Parent2 |
| TraceInfo 2 | N | TraceInfo OF Parent2 |
| ⋮ | | ⋮ |
| Signature N | 64 | SIGNATURE GIVEN BY USING PRIVATE KEY OF ParentN |
| TraceInfo N | N | TraceInfo OF ParentN |

FIG.13

| Field | Length | Description |
|---|---|---|
| Digest length | 2 | DATA LENGTH |
| Digest Hash | 32 | Hash VALUE OF Digest Type AND Digest Data |
| Digest Type | 4 | FORMAT OF DIGEST INFORMATION (E.G. EXIF) |
| Digest Data | N | COPY OF APP1 INCLUDING EXIF |

FIG. 14

[DataRecord]

| Field | DataType | Description |
|---|---|---|
| dataID | String | IDENTIFIER OF DATA. IDENTICAL TO ID OF TraceInfo |
| ownerID | String | IDENTIFIER OF OWNER OF DATA |
| rightsLicense | Enum | INFORMATION OF COPYRIGHT AND LICENSE |
| licenseeID | String | IDENTIFIER OF USER WHO IS LICENSEE ACCORDING TO LICENSE AGREEMENT |
| childrenIDList | Array of String | ARRAY OF IDs OF CHILD DATA OF DATA |

F I G. 15

[UserRecord]

| Field | DataType | Description |
|---|---|---|
| userID | String | IDENTIFIER OF USER |
| name | String | NAME OF USER |
| description | String | ATTRIBUTES OF USER (E.G. ADDRESS, EMAIL ADDRESS, ETC.) |
| originatorIDList | Array of String | IDENTIFIER OF GENERATING APPARATUS (E.G. CAMERA) |
| addressList | Array of P2Pdatabase Address | ADDRESS LIST OF CLIENTS USED IN P2P DATABASE |

F I G . 1 6

[Certificate]

| Field | DataType | Description |
|---|---|---|
| subject | String | IDENTIFIER OF CERTIFICATION TARGET (E.G. IDENTIFIER OF CAMERA) |
| publicKey | String | PUBLIC KEY TO BE CERTIFIED (E.G. PUBLIC KEY OF CAMERA) |
| issuer | String | IDENTIFIER OF ISSUER OF CERTIFICATE (E.G. IDENTIFIER OF MANUFACTURER OF CAMERA) |
| signature | String | ELECTRONIC SIGNATURE OF CERTIFICATE (SIGNATURE GIVEN TO CONFIGURATION BY USING PUBLIC KEY S OF MANUFACTURER) |

F I G. 17

| Key-value-array | Key & type | Value type | Description |
|---|---|---|---|
| dataRecord | dataID(string) | DataRecord | ASSOCIATIVE ARRAY OF DataRecord VALUE FOR IDENTIFIER OF DATA |
| userRecord | userID(string) | UserRecord | ASSOCIATIVE ARRAY OF UserRecord VALUE FOR IDENTIFIER OF USER |
| userID | addressID(string) | string | ASSOCIATIVE ARRAY OF IDENTIFIER OF USER |
| originatorKeyList | originatorID(string) | string | ASSOCIATIVE ARRAY OF VALUE OF PUBLIC KEY FOR IDENTIFIER (subject OF Certificate) OF GENERATING APPARATUS (E.G. CAMERA) |
| makerCertList | IssuerID(string) | Certificate | ASSOCIATIVE ARRAY OF Certificate VALUE OF GENERATING APPARATUS (E.G. CAMERA) FOR MANUFACTURER IDENTIFIER (issuer OF Certificate) |

FIG. 18

[rightsLicense]

| DEFINED VALUE | VALUE | CONTENTS |
|---|---|---|
| NoLicenseSpecified | 0 | COPYRIGHT/LICENSE OF DATA NOT SPECIFIED *IF THERE IS PARENT DATA, COPYRIGHT/LICENSE WHICH IS SAME AS THAT OF PARENT DATA IS APPLIED |
| NoRightsReserved_PublicDomain | 1 | COPYRIGHT OF DATA OWNED/PERMITTED TO SHARE, USE, AND EDIT BECAUSE IT IS IN PUBLIC DOMAIN |
| AllRightsReserved_FreeToShareAndUseCommertically | 2 | COPYRIGHT OF DATA OWNED/PERMITTED TO SHARE AND USE IRRESPECTIVE OF WHETHER OR NOT IT IS FOR COMMERCIAL USE |
| AllRightsReserved_FreeToModifyShareAndUseCommertically | 3 | COPYRIGHT OF DATA OWNED/PERMITTED TO SHARE, USE, AND EDIT IRRESPECTIVE OF WHETHER OR NOT IT IS FOR COMMERCIAL USE |
| AllRightsReserved_FreeToShareAndUse | 4 | COPYRIGHT OF DATA OWNED/PERMITTED TO SHARE AND USE FOR NON-COMMERCIAL USE |
| AllRightsReserved_FreeToModifyShareAndUse, | 5 | COPYRIGHT OF DATA OWNED/PERMITTED TO SHARE, USE, AND EDIT FOR NON-COMMERCIAL USE |
| AllRightsReserved | 6 | COPYRIGHT OF DATA OWNED/NOT DISCLOSED WHETHER OR NOT THERE IS LICENSE *DEFAULT SETTING IN CASE THAT VALUE IS NOT SPECIFIED AT TIME OF REGISTRATION |
| AllRightsReserved_UnderAgreement, | 7 | COPYRIGHT OF DATA OWNED *COPYRIGHT/LICENSE RIGHT TRANSFERRED TO LICENSEE ON BASIS OF SEPARATE AGREEMENT |
| AllRightsDelegated_UnderAgreement, | 8 | COPYRIGHT OF DATA OWNED *COPYRIGHT/LICENSE RIGHT TRANSFERRED TO LICENSEE ON BASIS OF SEPARATE AGREEMENT. OWNER AND UPSTREAM INFORMATION NOT DISCLOSED |

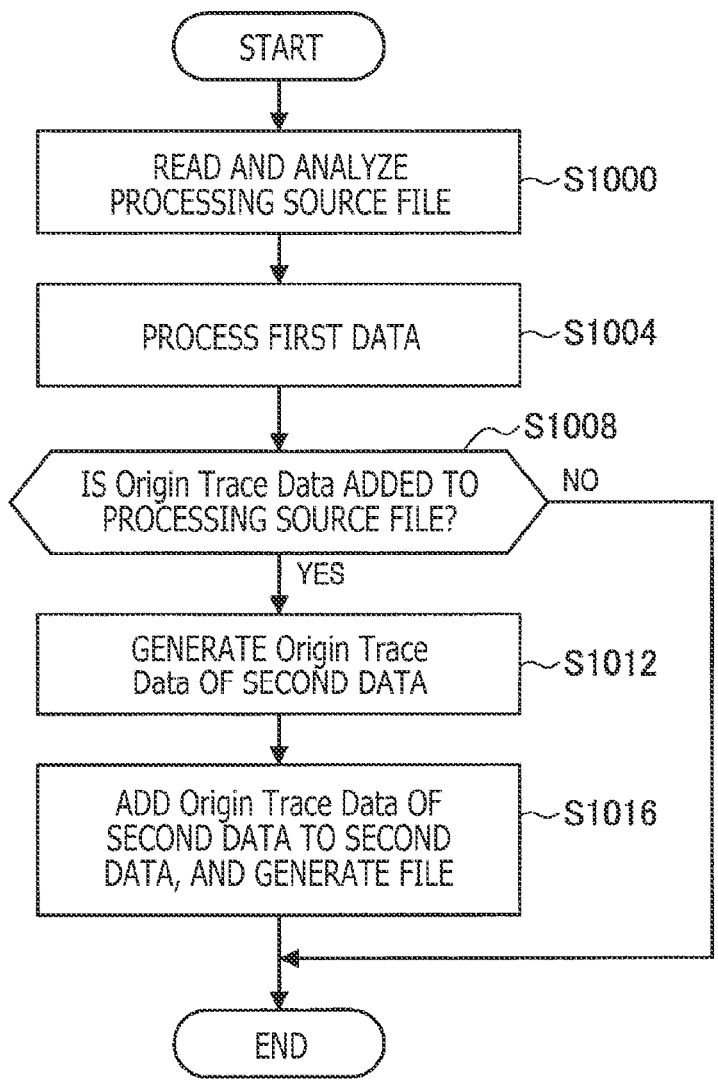

INFORMATION PROCESSING APPARATUS, INFORMATION PROCESSING METHOD, AND PROGRAM

CROSS REFERENCE TO RELATED APPLICATIONS

This application is a U.S. National Phase of International Patent Application No. PCT/JP2020/001801 filed on Jan. 21, 2020, which claims priority benefit of Japanese Patent Application No. JP 2019-030632 filed in the Japan Patent Office on Feb. 22, 2019. Each of the above-referenced applications is hereby incorporated herein by reference in its entirety.

TECHNICAL FIELD

The present disclosure relates to an information processing apparatus, an information processing method, and a program.

BACKGROUND ART

In recent years, services that use peer-to-peer databases including blockchains among others are under active development. For example, a copyright management service that uses a blockchain to examine metadata (e.g. copyrighted data, etc.) related to the authenticity of each piece of processed data and data (image data, etc.) generated by a sensor device such as a camera, a data distribution management service that traces a relation between processing source data and processed data (data generated by processing), and other services are under development. A specific example of the data distribution management service is explained with reference to FIG. 1. For example, it is assumed as depicted in FIG. 1 that, after a generating apparatus generates a file 0 including data 0, a processing apparatus A generates a file 1 including data 1 (processed data) by using the data 0 (processing source data). The processing apparatus A has a storage section storing a private key and a private key of public key cryptography as a pair. At the time of generating the file, the processing apparatus A includes, in the file 1, a certificate (denoted as "CERTIFICATE OF DATA 1" in FIG. 1) generated by giving an electronic signature to a hash value of the data 1 by using the pair of the keys, for example, by using a private key A. Then, a public key A of the processing apparatus A and the certificate of the data 1 are registered in a blockchain. It is assumed that thereafter a processing apparatus B generates a file 2 including data 2 (processed data) by using the data 1 (processing source data). At this time, similarly to the above, the processing apparatus B includes, in the file 2, a certificate (denoted as "CERTIFICATE OF DATA 2" in FIG. 1) generated by giving an electronic signature to a hash value of the data 2 by using a private key B stored on a storage section of the processing apparatus B, and a public key B of the processing apparatus B and the certificate of the data 2 are registered in the blockchain. The processing described above is performed in a chain-like manner in the course of data distribution, and an ID that can identify the data distribution is included in each certificate.

Then, an examining apparatus (not depicted) examines the certificate of the data 1 by using the public key A registered in the blockchain and examines the certificate of the data 2 by using the public key B, and thus, the authenticity of each piece of data can be examined. In addition, on the basis of, for example, the order of registration of certificates in the blockchain, the examining apparatus can also trace a relation between the processing source data and the processed data (note that the method of tracing is not necessarily limited to this). Technologies that use this mechanism include an information processing system according to the following PTL 1, for example.

CITATION LIST

Patent Literature

[PTL 1]
JP 2018-117287A

SUMMARY

Technical Problems

However, depending on the mechanism described above explained with reference to FIG. 1, it is not possible in some cases to appropriately realize an examination of the authenticity of each piece of data and tracing of a relation between processing source data and processed data. For example, it is required to register, in a blockchain, all pieces of tracing target processed data in an order. As a result, management of the registered data becomes complicated, and the number of transactions of the blockchain increases depending on the number of pieces of the registered data. Accordingly, operating costs of the blockchain and service become high in some cases. In addition, it is required to manage private keys used for generation of certificates, without causing leakages of the private keys. If the private keys are leaked, the reliability of the whole information processing system is lost. Further, in some cases, a malicious third party can also register processed data of another party in a blockchain, maliciously claiming that the processed data is original data created by the malicious third party. Accordingly, there is a problem in terms of the authenticity of metadata related to data and an examination of the metadata.

To cope with this, the present disclosure has been made in view of the circumstance described above and provides a novel and improved information processing apparatus, information processing method, and program that enable more appropriate realization of an examination of the authenticity of metadata related to each piece of data and tracing of a relation between processing source data and processed data.

Solution to Problems

According to the present disclosure, there is provided an information processing apparatus including a key generating section that generates a public key and a private key of second data generated on the basis of at least one or more pieces of first data; a certificate generating section that generates a certificate by using a private key of the first data to give an electronic signature to the public key of the second data or an ID that is generated by using the public key of the second data and is capable of identifying the public key of the second data, and to the second data or data generated from the second data; and a trace data processing section that adds, to the second data, the private key of the second data and trace data to be used for tracing a relation between the first data and the second data. The trace data includes the certificate generated by the certificate generating section and trace data added to the first data.

In addition, according to the present disclosure, there is provided a program causing a computer to implement generating a public key and a private key of second data generated on the basis of at least one or more pieces of first data; generating a certificate by using a private key of the first data to give an electronic signature to the public key of the second data or an ID that is generated by using the public key of the second data and is capable of identifying the public key of the second data, and to the second data or data generated from the second data; and adding, to the second data, the private key of the second data and trace data to be used for tracing a relation between the first data and the second data. The trace data includes the certificate and trace data added to the first data.

In addition, according to the present disclosure, there is provided an information processing apparatus including a data generating section that generates data; a key generating section that generates a public key and a private key of the data; a certificate generating section that generates a certificate by using a private key of the information processing apparatus to give an electronic signature to the public key of the data or an ID that is generated by using the public key of the data and is capable of identifying the public key of the data, and to the data or data generated from the data; and a trace data processing section that adds, to the data, the private key of the data and trace data that is to be used for tracing generation of the data by the information processing apparatus and includes the certificate generated by the certificate generating section.

In addition, according to the present disclosure, there is provided an information processing apparatus including an examining section that uses trace data and information registered in a database, the trace data being used for tracing a relation between at least one or more pieces of first data and second data generated on the basis of the first data and being added to the second data, to thereby examine authenticity of the second data or data generated from the second data; and a registering section that registers, in the database, the second data or an ID that is capable of identifying the second data. The trace data includes a certificate and trace data added to the first data, the certificate being generated by using a private key of the first data to give an electronic signature to a public key of the second data or an ID that is generated by using the public key of the second data and is capable of identifying the public key of the second data, and to the second data or the data generated from the second data.

In addition, according to the present disclosure, there is provides an information processing method executed by a computer. The information processing method includes using trace data and information registered in a database, the trace data being used for tracing a relation between at least one or more pieces of first data and second data generated on the basis of the first data and being added to the second data, to thereby examine authenticity of the second data or data generated from the second data; and registering, in the database, the second data or an ID that is capable of identifying the second data. The trace data includes a certificate and trace data added to the first data, the certificate being generated by using a private key of the first data to give an electronic signature to a public key of the second data or an ID that is generated by using the public key of the second data and is capable of identifying the public key of the second data, and to the second data or the data generated from the second data.

In addition, according to the present disclosure, there is provided a program that provides an external apparatus with trace data that is used for tracing a relation between at least one or more pieces of first data and second data generated on the basis of the first data and is added to the second data. The external apparatus examines authenticity of the second data or data generated from the second data, by using the trace data and information registered in a database. The program causing a computer to realize a configuration that the trace data includes a certificate and trace data added to the first data, the certificate being generated by using a private key of the first data to give an electronic signature to a public key of the second data or an ID that is generated by using the public key of the second data and is capable of identifying the public key of the second data, and to the second data or the data generated from the second data.

BRIEF DESCRIPTION OF DRAWINGS

FIG. 10 is a figure depicting a configuration example of Origin Trace Data.

FIG. 11 is a figure depicting a configuration example of data information (Data Info) in Origin Trace Data.

FIG. 12 is a figure depicting a configuration example of trace data (Trace Info) in Origin Trace Data.

FIG. 13 is a figure depicting a configuration example of digest information (DigestInfo) in the trace data (Trace Info).

FIG. 14 is a figure depicting a configuration example of data information (DataRecord) registered in the P2P database.

FIG. 15 is a figure depicting a configuration example of user information (UserRecord) registered in the P2P database.

FIG. 16 is a figure depicting a configuration example of a certificate of a public key of the generating apparatus registered in the P2P database.

FIG. 17 is a figure depicting a configuration example of an associative array registered in the P2P database.

FIG. 18 is a figure depicting a list related to copyrights that includes defined values, values to be used in a program, and copyright contents.

FIG. 19 is a flowchart depicting an example of a flow of data processing performed by the processing apparatus.

DESCRIPTION OF EMBODIMENT

Figure 1:
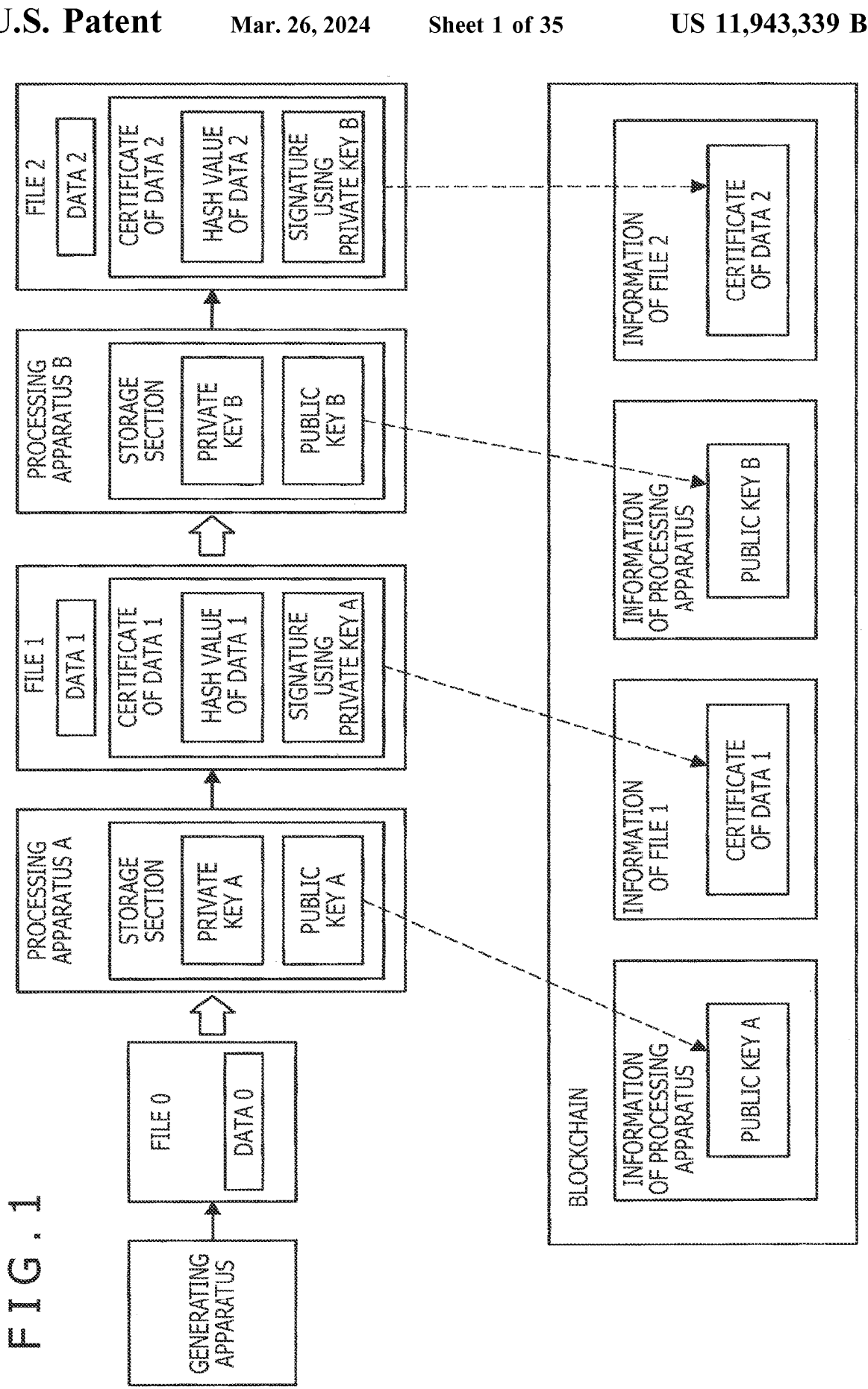
FIG. 1 is a figure for explaining a technology related to a blockchain, as a background art of the present disclosure.

Hereinafter, a suitable embodiment of the present disclosure is explained in detail with reference to the attached figures. Note that constituent elements having substantially identical functional configurations in the present specification and the figures are given identical reference signs and that overlapping explanations thereof are thus omitted.

Note that explanations will be given in the following order.

1. Overview of peer-to-peer databases
2. Configuration example of information processing system
3. Configuration example of each apparatus and data to be generated
4. Configuration example of data
5. Copyrights
6. Process flow example of each apparatus
7. Example
8. Hardware configuration example of each apparatus

1. Overview of Peer-to-Peer Databases

Before one embodiment according to the present disclosure is explained, the overview of peer-to-peer databases is first explained.

In an information processing system according to the present disclosure, distributed peer-to-peer databases that are distributed across a peer-to-peer network are used. Note that the peer-to-peer network is called a peer-to-peer distributed file system in some cases. In the present document, the peer-to-peer network is called a "P2P network," and the peer-to-peer databases are called "P2P databases." Examples of the P2P databases include blockchains that are distributed across the P2P network. Accordingly, first, the overview of a blockchain system is explained as an example.

Figure 2:
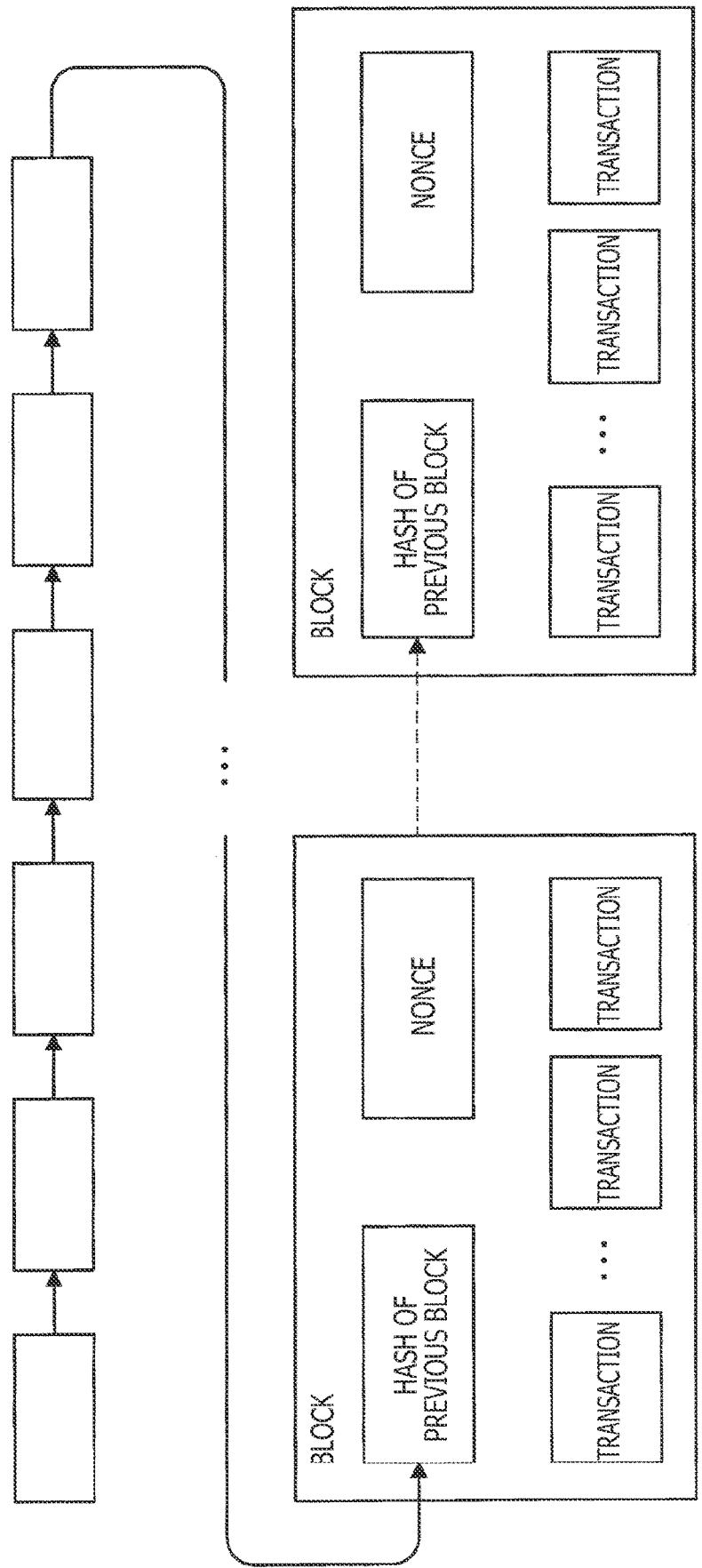
FIG. 2 is a figure for explaining the technology related to the blockchain, as a background art of the present disclosure.

As depicted in FIG. 2, a blockchain is data including a string of multiple blocks that are continuous with each other as if they form a chain. Each block can store one piece or two or more pieces of target data as transaction data (transaction).

Examples of blockchains include ones that are used for exchanges of data of a cryptocurrency such as Bitcoin, for example. A blockchain used for exchanges of data of a cryptocurrency includes hashes of previous blocks and values called nonces, for example. A hash of the previous block is information used for deciding whether or not a current block is the "correct block" which is continuous with the previous block correctly. The nonces are information used for preventing identity frauds in authentication performed by using hashes, and falsification is prevented by using the nonces. Examples of the nonces include a character string, a digit string, data representing a combination of a character string and a digit string, for example.

In addition, in a blockchain, an electronic signature generated by using an encryption key is given to each piece of transaction data, and identity frauds are thus prevented. In addition, each piece of transaction data is disclosed and is shared in the whole P2P network. Note that each piece of transaction data may be encrypted by using an encryption key.

Figure 3:
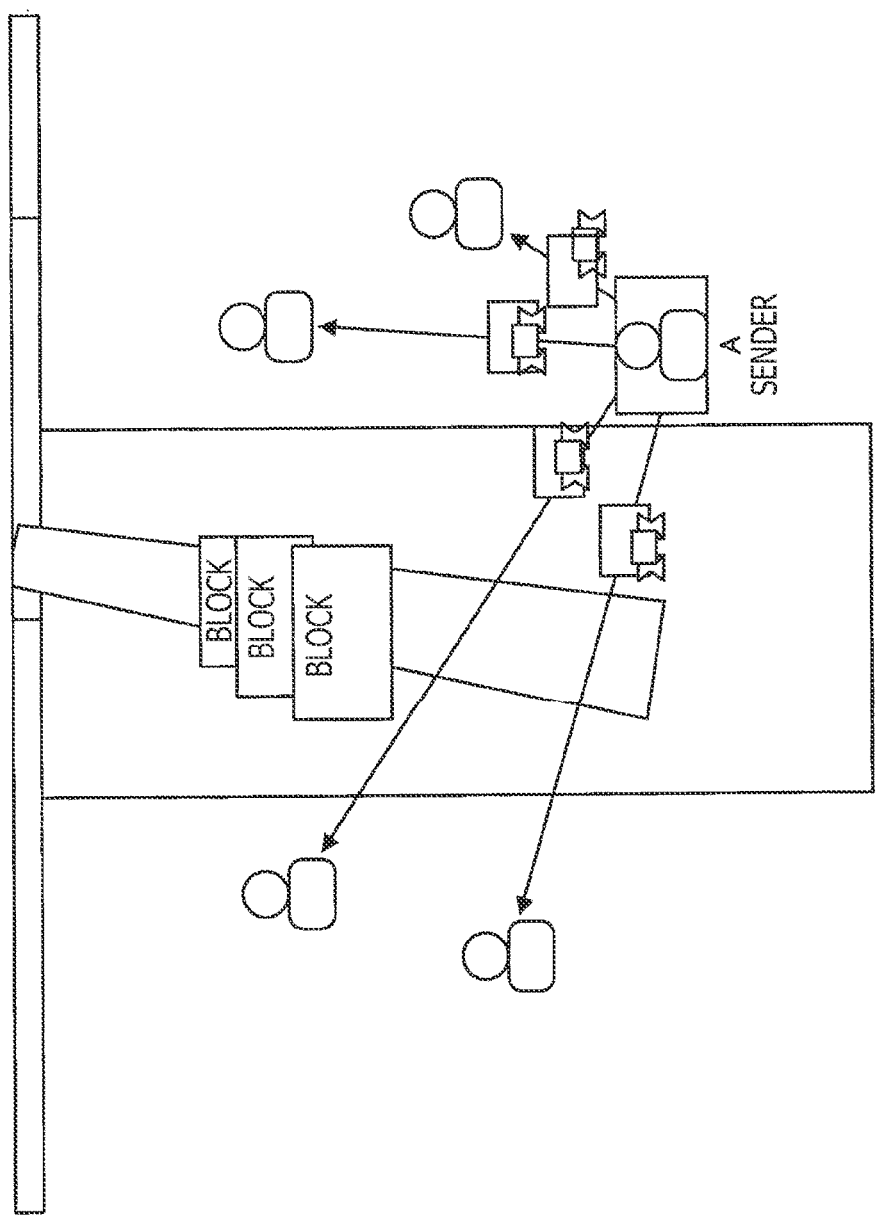
FIG. 3 is a figure for explaining the technology related to the blockchain, as a background art of the present disclosure.

FIG. 3 is a figure depicting a manner in which target data is registered by a user A in a blockchain system. The user A gives the target data to be registered in a blockchain an electronic signature generated by using a private key of the user A. Then, the user A broadcasts, on a P2P network, transaction data including the target data to which the electronic signature is given. Thus, it is proven that the owner of the target data is the user A.

Figure 4:
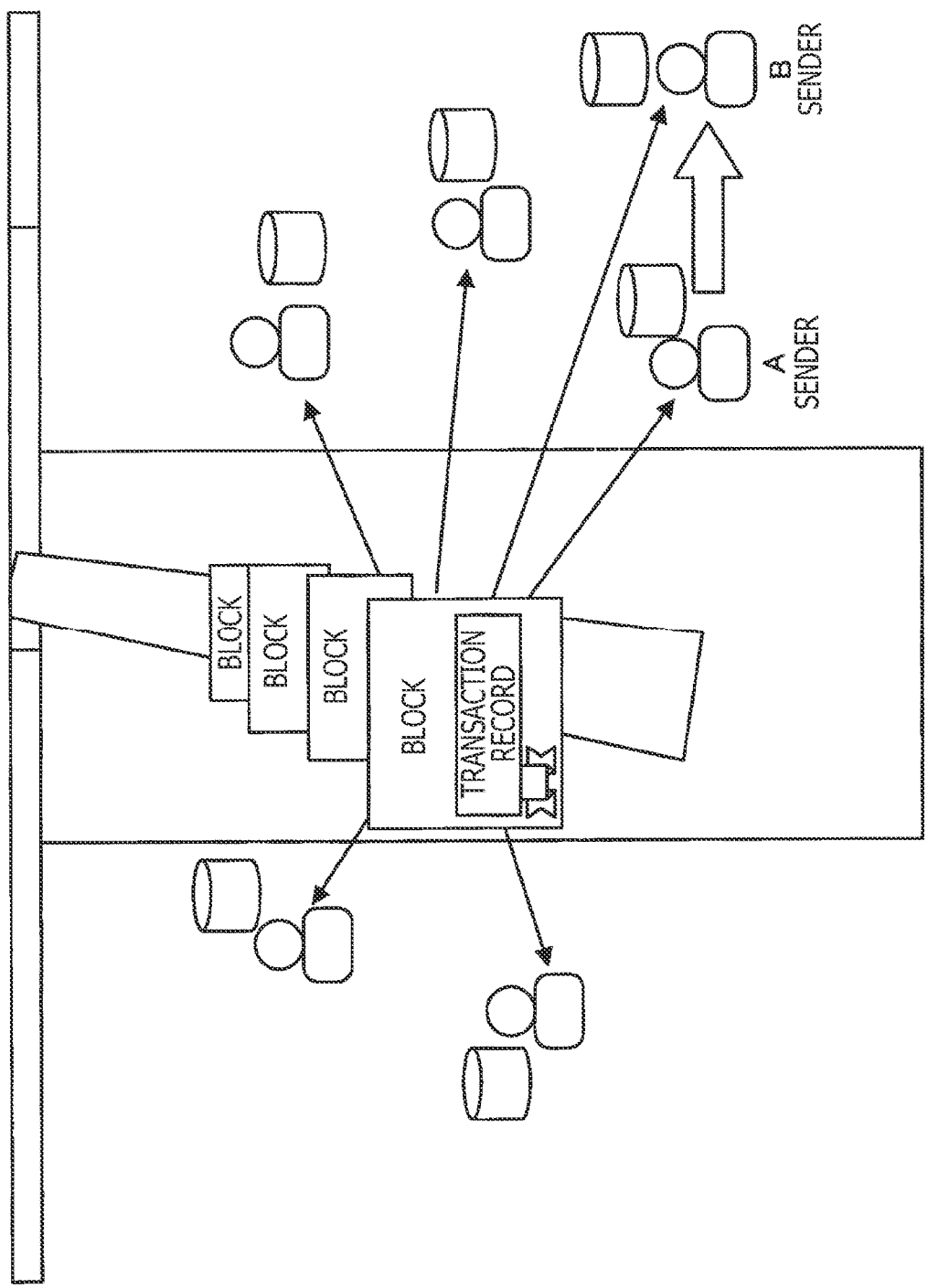
FIG. 4 is a figure for explaining the technology related to the blockchain, as a background art of the present disclosure.

FIG. 4 is a figure depicting a manner in which the ownership of the target data is transferred from the user A to a user B in the blockchain system. The user A gives transaction data an electronic signature generated by using the private key of the user A and includes a public key of the user B in the transaction data. Thus, it is represented that the ownership of the target data has been transferred from the user A to the user B. In addition, when conducting the transaction of the target data, the user B may acquire a public key of the user A from the user A and acquire the target data that is given the electronic signature or is encrypted.

In addition, in the blockchain system, for example, by using the side chain technology, it is also possible to include other target data that is different from a cryptocurrency, in a blockchain of Bitcoin or the like (a blockchain used for exchanges of data of an existing cryptocurrency).

2. Configuration Example of Information Processing System

Figure 5:
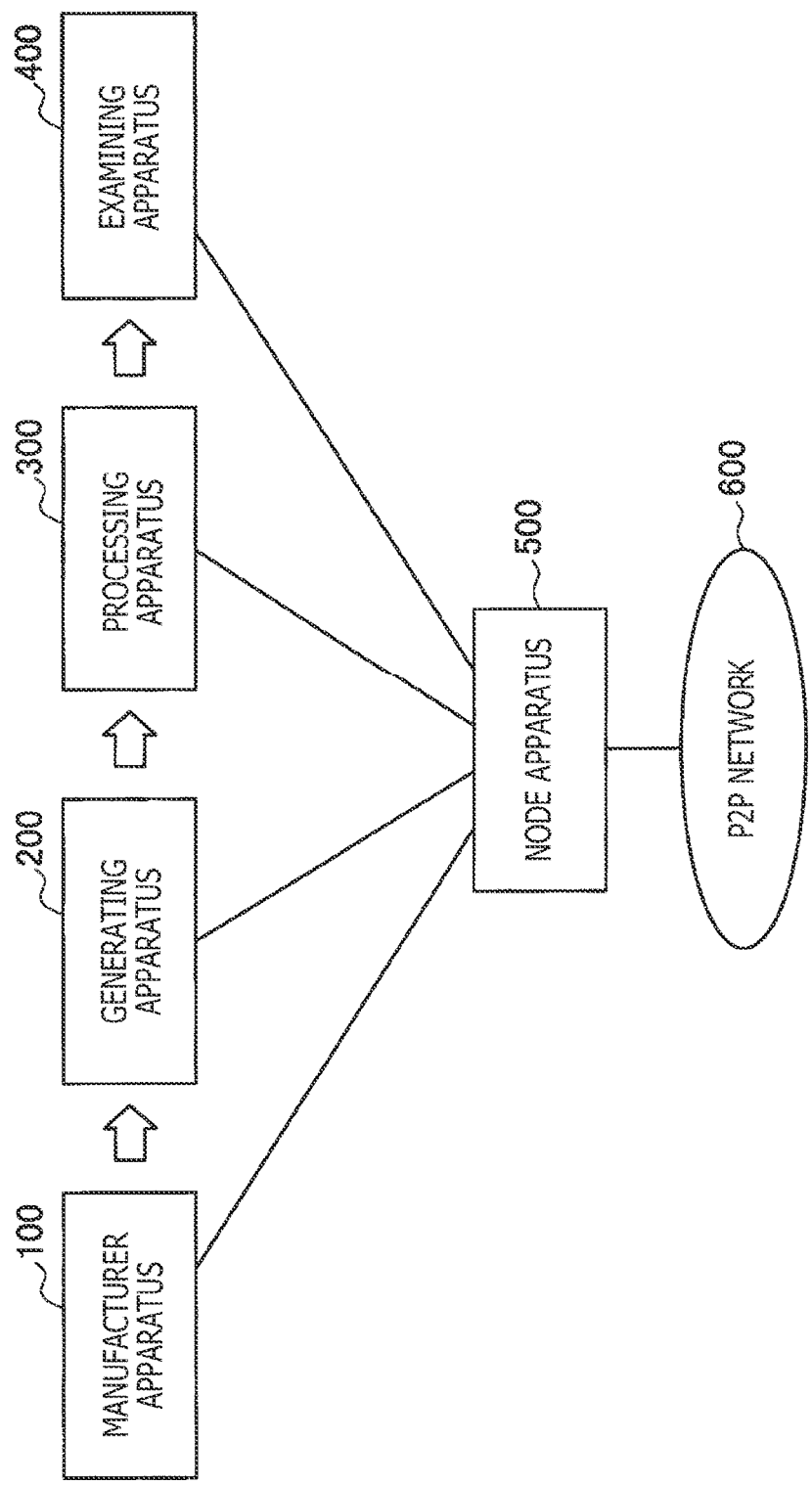
FIG. 5 is a block diagram depicting a configuration example of an information processing system according to a present embodiment.

In the description above, the overview of P2P databases has been explained. Next, a configuration example of an information processing system according to one embodiment of the present disclosure is explained with reference to FIG. 5. FIG. 5 is a block diagram depicting a configuration example of the information processing system according to the present embodiment.

As depicted in FIG. 5, the information processing system according to the present embodiment includes a manufacturer apparatus 100, a generating apparatus 200, a processing apparatus 300, an examining apparatus 400, and a node apparatus 500. Then, the node apparatus 500 is connected to a P2P network 600.

The manufacturer apparatus 100 is an apparatus of a manufacturer of the generating apparatus 200 and is an information processing apparatus that manages a key of the generating apparatus 200. In the present embodiment, explanations are given by using, as an example, a case that the generating apparatus 200 is a camera (i.e. processing target data is image data), and in such a case, the manufacturer apparatus 100 is an information processing apparatus of a manufacturer of the generating apparatus 200 (camera), for example. The generating apparatus 200 is an information processing apparatus that generates original data to be used as processing source data. The processing apparatus 300 is an information processing apparatus that generates processed data by using the original data generated by the generating apparatus 200. Here, while only one processing apparatus 300 is displayed in the example depicted in FIG. 5, the number of the processing apparatuses 300 is not limited particularly, and the processing apparatus 300 may generate processed data by using processing source data generated by another processing apparatus 300. The processing apparatus 300 can be, for example, a computer used for editing image data. The examining apparatus 400 is an information processing apparatus that examines the authenticity of each piece of data by operating in cooperation with the node apparatus 500, and traces a relation between processing source data and processed data. The node apparatus 500 is an information processing apparatus that retains a P2P database, and performs registration of data in the P2P database, acquisition of data from the P2P database, and the like. The P2P network 600 is a network over which P2P databases are distributed.

Note that the configuration described above explained with reference to FIG. 5 is merely an example, and the configuration of the information processing system according to the present embodiment is not limited to the example. The configuration of the information processing system according to the present embodiment can be modified flexibly according to specifications or how it is operated. In addition, while the processing target data is image data in the case explained above as an example in the present embodiment, the processing target data is not necessarily limited to this. For example, the processing target data may be music data, certain sensor data, or the like.

3. Configuration Example of Each Apparatus and Data to be Generated

In the description above, the configuration example of the information processing system according to the one embodiment of the present disclosure has been explained. Next, a configuration example of each apparatus according to the present embodiment and data generated by each apparatus (or data stored by each apparatus) are explained with reference to FIG. 6 to FIG. 9. Note that keys to be used by each apparatus according to the present embodiment are keys of public key cryptography such as elliptic curve cryptography, and the keys include a private key and a public key as a pair.

Figure 6:
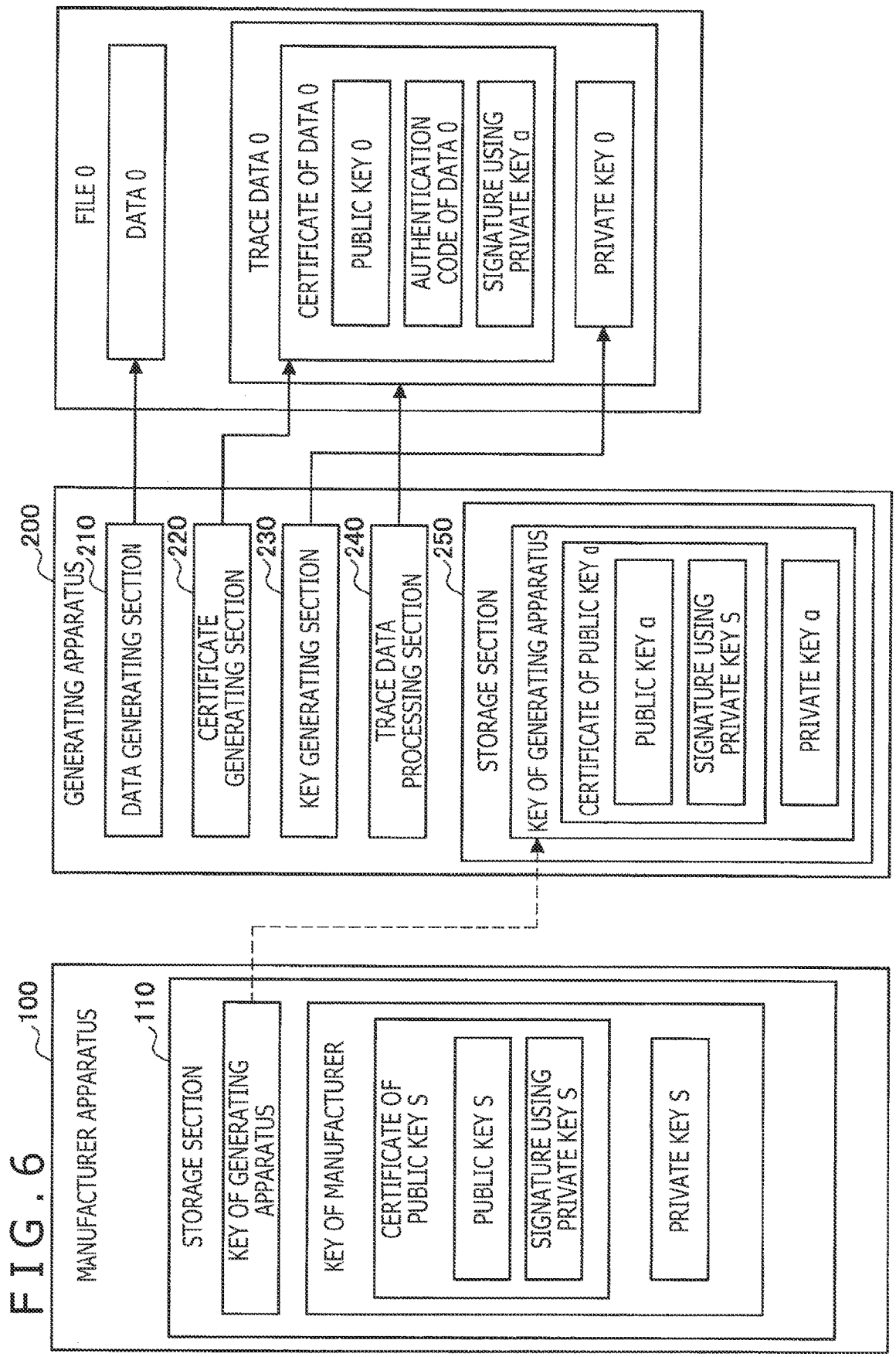
FIG. 6 is a block diagram depicting configuration examples of a manufacturer apparatus and a generating apparatus and a configuration example of data generated by the generating apparatus.

FIG. 6 is a block diagram depicting configuration examples of the manufacturer apparatus 100 and the generating apparatus 200 and a configuration example of data generated by the generating apparatus 200. Note that FIG. 6 depicts examples of the main configurations of each apparatus and each piece of data according to the present embodiment, and partial configurations are omitted (the same applies also to FIG. 7 to FIG. 9).

As depicted in FIG. 6, the manufacturer apparatus 100 includes a storage section 110, and the storage section 110 stores keys of the generating apparatus 200 and keys of the manufacturer. The keys of the manufacturer include a private key S and a certificate of a public key S generated by giving a signature to the public key S by using the private key S. In addition, the keys of the generating apparatus 200 include a private key a and a certificate of a public key a generated by giving a signature to the public key a by using the private key S.

In addition, as depicted in FIG. 6, the generating apparatus 200 includes a data generating section 210, a certificate generating section 220, a key generating section 230, a trace data processing section 240, and a storage section 250. The data generating section 210 is configured to generate, for example, image data (denoted as "data 0" in FIG. 6) as data. The key generating section 230 is configured to generate keys (a public key and a private key) of public key cryptography for the data 0 generated by the data generating section 210. The storage section 250 stores the keys of the generating apparatus 200 explained in the description above. The certificate generating section 220 generates a certificate of the data 0 by using the private key a of the generating apparatus 200 to give an electronic signature to a public key 0 of the data 0 (or an ID that is generated by using the public key 0 of the data 0 and can identify the public key 0 of the data 0) and an authentication code of the data 0 (that is data generated from the data 0 and is information used for authentication of the data 0, the details of which are to be described below, or may alternatively be the data 0 itself). The trace data processing section 240 generates a file 0 by adding trace data and a private key 0 of the data 0 to the data 0. The trace data is used for tracing that the data 0 is generated by the generating apparatus 200, and includes the certificate generated by the certificate generating section 220.

Figure 7:
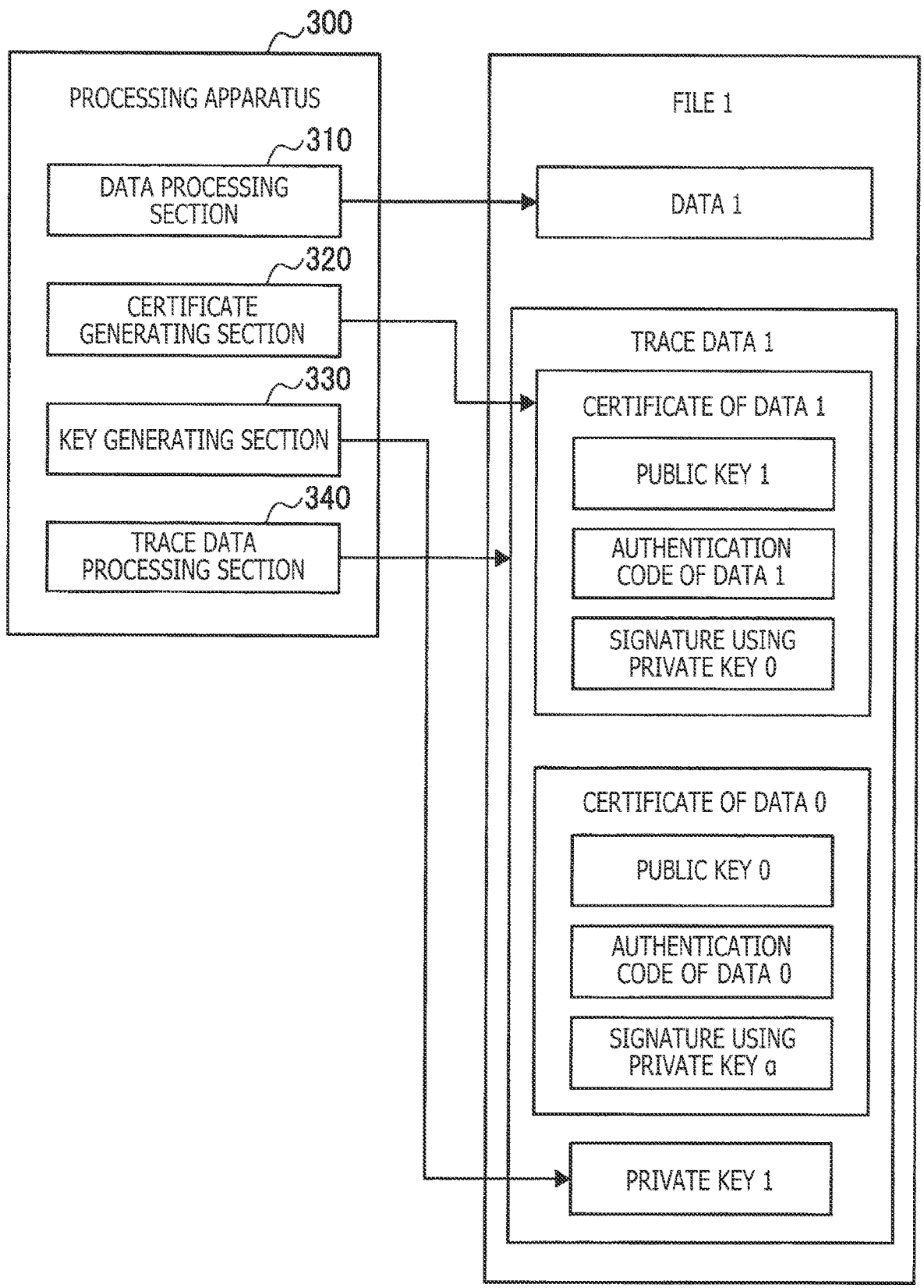
FIG. 7 is a block diagram depicting a configuration example of a processing apparatus and a configuration example of data generated by the processing apparatus.

FIG. 7 is a block diagram depicting a configuration example of the processing apparatus 300 and a configuration example of data generated by the processing apparatus 300. FIG. 7 depicts a case that the processing apparatus 300 generates data ("data 1" in FIG. 7) on the basis of the data 0 generated by the generating apparatus 200. As depicted in FIG. 7, the processing apparatus 300 includes a data processing section 310, a certificate generating section 320, a key generating section 330, and a trace data processing section 340. The data processing section 310 is configured to generate second data (processed data; the data 1 in the example depicted in FIG. 7) on the basis of at least one or more pieces of first data (processing source data; the data 0 in the example depicted in FIG. 7). For example, the data processing section 310 generates the data 1 by performing image processing on the data 0, which is image data. The key generating section 330 is configured to generate keys (a public key and a private key) of public key cryptography for the data 1 generated by the data processing section 310. The certificate generating section 320 generates a certificate of the data 1 by using the private key 0 of the data 0 to give an electronic signature to a public key 1 of the data (or an ID that is generated by using the public key 1 of the data 1 and can identify the public key of the data 1) and an authentication code of the data 1 (that is data generated from the data 1 and is information used for authentication of the data 1, the details of which are to be described below, or may alternatively be the data 1 itself). The trace data processing section 340 generates a file 1 by adding, to the data 1 (second data), a private key 1 of the data 1 (second data) and trace data used for tracing a relation between the data 0 (first data) and the data 1 (second data). Note that the trace data includes the certificate generated by the certificate generating section 320 and the trace data added to the data 0 (first data). When the file 1 is generated, the trace data processing section 340 discards the private key 0 after the certificate of the data 1 is generated. Note that hereinafter the first data used for the generation of the second data is called "parent data," and the second data is called "child data" in some cases. In addition, each piece of data that is continuous with and precedes a certain piece of data in a chain-like relation of pieces of data is called "ancestor data" in some cases.

As explained with reference to FIG. 6 and FIG. 7, because the trace data including the certificate of the second data and the certificate added to the first data is added to the second data, a relation between the pieces of data can be traced appropriately. More specifically, by using the public key of the first data which is included in the certificate of the first data, the certificate of the second data generated by using the private key which forms a pair with the public key can be examined. Thus, by tracing backward pieces of data that are in a chain-like relation, examining each certificate included in each piece of trace data, and examining a certificate of original data by using the public key a of the generating apparatus 200, each piece of data can be certified as data processed on the basis of the original data generated by the generating apparatus 200. In addition, while the private key of the second data is included in the trace data to be added to the second data, the private key of the first data is not included in the trace data to be added to the second data. Thus, leakages of the private key of the ancestor data can be prevented appropriately. In addition, because the certificate of the data 0 generated by using the private key a of the generating apparatus 200 is included in the trace data as depicted in FIG. 6, it can be examined that the original data is generated by the generating apparatus 200. In addition, it is possible to prevent a malicious third party from registering data with trace data of another party and from maliciously claiming that the data is created by the malicious third party. For example, it possible to realize a copyright managing system in which only the owner of a camera can register original photographs and processed photographs.

Figure 8:
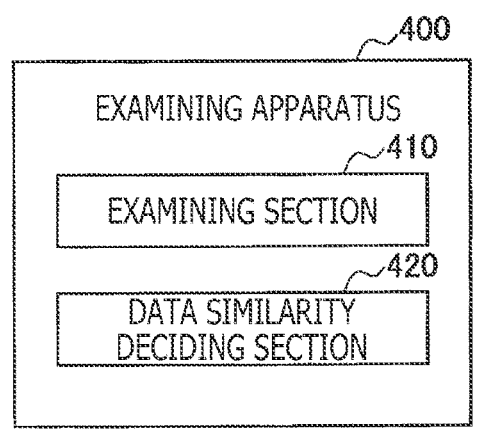
FIG. 8 is a block diagram depicting a configuration example of an examining apparatus.

FIG. 8 is a block diagram depicting a configuration example of the examining apparatus 400. As depicted in FIG. 8, the examining apparatus 400 includes an examining section 410 and a data similarity deciding section 420. The examining section 410 is configured to examine the authenticity of data generated by the generating apparatus 200 and the processing apparatus 300 and trace relations between the data, by operating in cooperation with the node apparatus 500. More specifically, the examining section 410 is configured to provide trace data to the node apparatus 500 that examines the authenticity of second data by using the trace data and information registered in a database (a P2P database in the present embodiment). Here, the trace data is used for tracing a relation between at least one or more pieces of first data and second data generated on the basis of the first data and is added to the second data. The node apparatus 500 examines the authenticity of the second data and traces a relation between the pieces of data, by using the trace data. Thereafter, the examining section 410 receives an examination result from the node apparatus 500. By deciding a similarity between the first data and the second data, the data similarity deciding section 420 can decide that the second data is generated on the basis of the first data, and so on. For example, the data similarity deciding section 420 computes a similarity between multiple pieces of image data by image data analysis or the like (not limited to this), and in a case that the similarity is equal to or higher than a predetermined threshold, the data similarity deciding section 420 can decide that those pieces of data have a relation of first data and second data (i.e. a parent-child relation). On the other hand, in a case that the computed similarity is lower than the predetermined threshold, the data similarity deciding section 420 can decide that those pieces of data do not have a relation of first data and second data. Thus, the examining apparatus 400 can realize a service of certifying the authenticity or copyright of an original photograph, a service of examining whether or not a target photograph is a stolen photograph by deciding an image similarity with a registered original photograph, or other services. These services are mentioned below.

Figure 9:
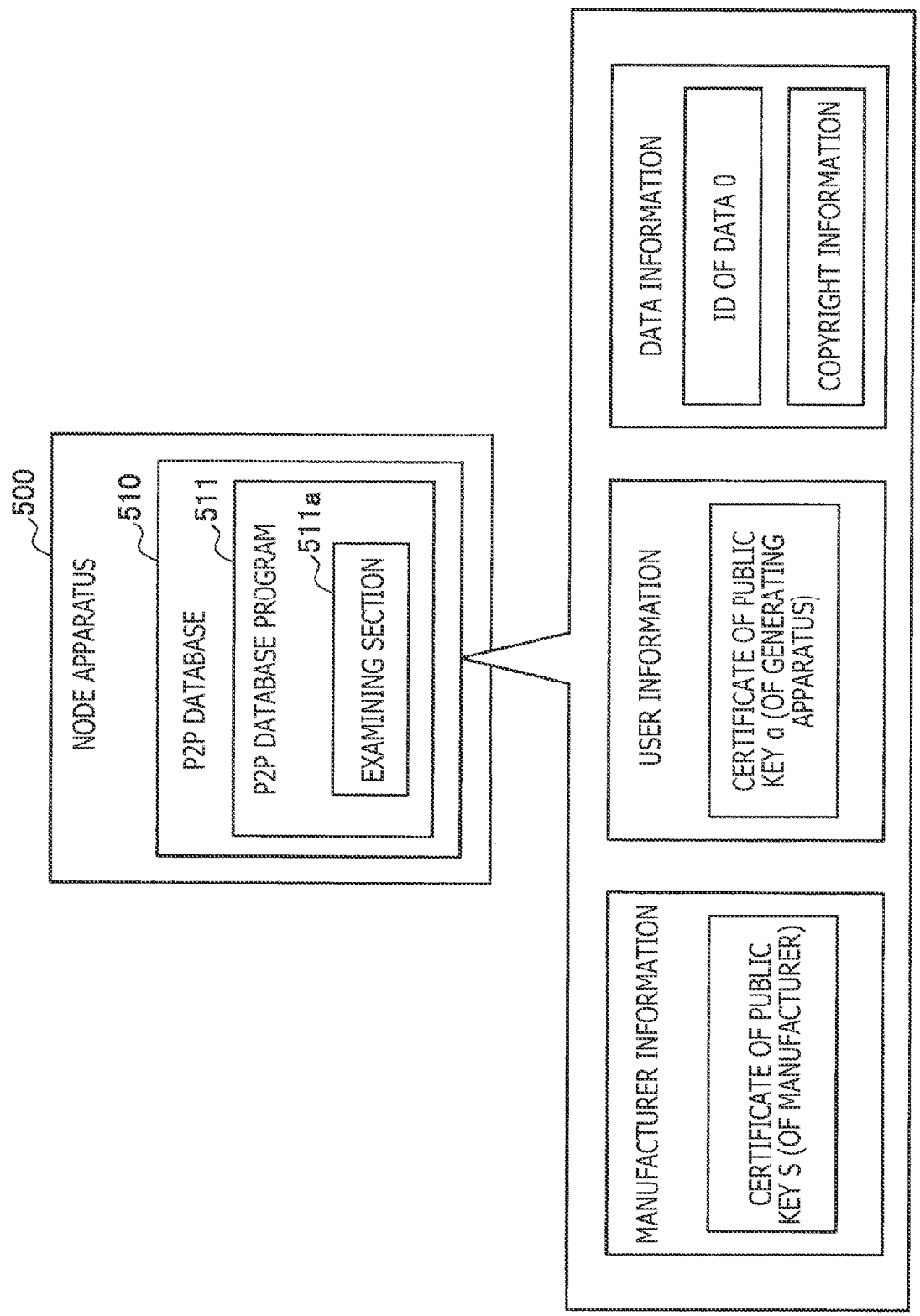
FIG. 9 is a block diagram depicting a configuration example of a node apparatus and a configuration example of data registered in a P2P database by the node apparatus.

FIG. 9 is a block diagram depicting a configuration example of the node apparatus 500 and a configuration example of data registered in the P2P database by the node apparatus 500. As depicted in FIG. 9, the node apparatus 500 includes a P2P database 510. In addition, as depicted in FIG. 9, the P2P database 510 includes a P2P database program 511. Further, the P2P database program 511 includes an examining section 511a. The P2P database 510 is a database retained by the node apparatus 500 and is a node of a blockchain, for example. More important data whose authenticity is required to be proven is registered in the P2P database 510. Various types of data registered in the P2P database 510 may be given electronic signatures generated by using encryption keys or may be encrypted by using encryption keys. Note that details of the data registered in the P2P database 510 are not limited particularly. The P2P database program 511 is a predetermined program that is provided in the P2P database 510 and executed on the P2P database 510. By using the P2P database program 511, various processes including transactions of a cryptocurrency such as Bitcoin are realized while the consistency of the processes are maintained according to a predetermined rule, for example. In addition, by providing the P2P database program 511 in the P2P database 510, the risk of unauthorized modifications of the program is reduced. The P2P database program 511 may be a chain code in Hyperledger or may be a smart contract. The examining section 511a is configured to realize part of the function of the P2P database program 511 and is configured to examine the authenticity of second data (or data generated from the second data) and traces a relation between pieces of data, by using trace data and information registered in a database (the P2P database in the present embodiment). Here, the trace data is used for tracing a relation between at least one or more pieces of first data and second data generated on the basis of the first data and is added to the second data. More specifically, by using a public key of the first data included in trace data added to the first data (or an ID that is generated by using the public key of the first data and can identify the public key of the first data), the examining section 511a examines a certificate of the second data that is included in trace data and has an electronic signature given by using a private key of the first data. The examining section 511a repetitively performs examinations of certificates so as to trace backward pieces of data that have a chain-like relation. In addition, the examining section 511a also functions as a registering section (not depicted) that registers the second data or the ID that can identify the second data in the P2P database 510 after a successful examination.

In addition, as depicted in FIG. 9, the certificate of the public key S of the manufacturer generated by giving the electronic signature to the public key S by using the private key S of the manufacturer is registered in the P2P database 510 as manufacturer information. In addition, the certificate of the public key a generated by giving the electronic signature to the public key a of the generating apparatus 200 (or an identifier of the public key a of the generating apparatus 200) by using the private key S of the manufacturer is also registered in the P2P database 510 as user information (UserRecord). Note that, after its signature is examined by using the public key S of the manufacturer and it is examined that the generating apparatus 200 is owned by the user, the certificate of the public key a is registered in the P2P database 510. In addition, the certificate of the public key a may not be registered in the P2P database 510, and the public key a of the generating apparatus 200 (or an identifier of the public key a of the generating apparatus 200) may be registered in the P2P database 510 after a signature examination is performed by using the public key S of the manufacturer. An ID and copyright information of the foremost data (the "data 0" in the example depicted in FIG. 9; also called "original data" in the present document) in a chain-like relation of data are registered in the P2P database 510 as data information (DataRecord), for example. Note that an ID and copyright information of each piece of data generated after the data 0 can also be registered as data information at a predetermined timing (details are mentioned below).

As depicted in FIG. 9, by registering the certificate of the public key a of the generating apparatus 200 in the P2P database 510, a relation between pieces of data can be traced appropriately. More specifically, the examining section 511a of the node apparatus 500 can examine each certificate included in trace data so as to trace backward pieces of data having a chain-like relation, as described above, and an examination of a certificate included in trace data of the foremost data in the chain-like relation can be performed appropriately by using the public key a of the generating apparatus 200 of the foremost data that is registered in the P2P database 510 (or an ID that is generated by using the public key a of the generating apparatus 200 and can identify the public key a of the generating apparatus 200). In addition, by this technique, if at least the public key a of the generating apparatus 200 is registered in the P2P database 510, certificates for tracing relations between pieces of data can be examined by using trace data. Accordingly, a transaction does not have to be generated to the P2P database 510 by registering each piece of data separately, and the operating costs of the P2P database 510 and services can be kept low. In addition, because relations between pieces of data can be examined by using certificates of trace data, each piece of data can be registered in the P2P database no matter what the order of the data is, and data management becomes easier.

4. Configuration Example of Data

In the description above, the configuration example of each apparatus and the data generated by each apparatus (or data stored by each apparatus) according to the present embodiment has been explained. Next, a configuration example of data generated by each apparatus (or data stored by each apparatus) is explained.

4.1. Configuration Example of Trace Data, Etc

First, a configuration example of trace data or the like is explained. When adding trace data, the trace data processing section 240 of the generating apparatus 200 and the trace data processing section 340 of the processing apparatus 300 add data information (Data Info) and a private key (Private Key) of the data along with the trace data (Trace Info) as depicted in FIG. (note that the data information is omitted in FIG. 6 and FIG. 7). The data information (Data Info) and the private key (Private Key) of the data related to first data are not added to second data, and the trace data (Trace Info) is added to the second data as a history. Note that, because data lengths (Length) depicted in FIG. 10 depend on hash values, private keys, encryption methods of public keys, and security levels, the data lengths are merely examples (the same applies also to FIG. 11 to FIG. 13). In addition, because public keys can be restored from messages to which signatures are given and the signatures in a case of elliptic curve cryptography, hash values may be recorded instead of the public keys, and signature examinations may be performed by using the hash values. By adopting this examination method, the size of the whole trace data can be reduced. Hereinafter, data information (Data Info), trace data (Trace Info), and a private key (Private Key) of the data are collectively called "Origin Trace Data" as information used for tracing original data.

FIG. 11 is a figure depicting a configuration example of the data information (Data Info) in FIG. 10. As depicted in FIG. 11, the data information (Data Info) includes a data type (Data Type), the number of hashes (Number of Hashes), and hash values (Hash1 to HashN). Information representing a data format such as a JPEG file is stored as the data type (Data Type). Hash values of data areas (Data Area 1 to Data Area N) are stored as the hash values (Hash1 to HashN). For example, distinctions may be made between multiple areas of data itself according to a predetermined method, or distinctions may be made between, for example, data itself (e.g. JPEG compressed data) and metadata added to the data (e.g. EXIF metadata), as mutually different areas. A hash value of second data is obtained by linking the hash values of the data information (Data Info) and further determining a hash value of the resultant concatenation, and is used for generation of an ID mentioned below.

FIG. 12 is a figure depicting a configuration example of the trace data (Trace Info) in FIG. 10. As depicted in FIG. 12, the trace data (Trace Info) includes a data length (Length of TraceInfo); an ID; digest information (DigestInfo); a public key of the data (PublicKey); a hash value of a message which is a concatenation of IDs of at least one or more pieces of parent data (ParentsHash; in a case that the data is original data, ParentsHash is a hash value of the public key of the generating apparatus 200); the number of pieces of parent data (Number of parents); an electronic signature given by using a private key of parent data (Signature 1); and trace data added to the parent data (TraceInfo 1). Note that, in a case that there are multiple pieces of parent data, the number of included electronic signatures and the number of pieces of trace data added to the parent data (Signature 2 to Signature N, TraceInfo 2 to TraceInfo N) correspond to the number of the parents. Signature messages which are concatenations of at least certification target ID, PublicKeyID, and ParentsHash are given signatures by using the private keys of the parent data. In a case that DigestInfo is included in the trace data, DigestHash mentioned below is concatenated as a signature message.

"ParentsHash" and "ID" are explained here. The trace data processing section 340 of the processing apparatus 300 performs a calculation according to a cryptographic hash function by using IDs that can identify at least one or more pieces of first data, to generate "ParentsHash" (e.g. a hash values of an ID that can identify the first data). In addition, the trace data processing section 340 adds, to trace data, "ID" that is generated by performing a calculation according to a cryptographic hash function (e.g. MAC (Message Authentication Code), etc.) by using at least a hash value of second data, a public key of the second data, and ParentsHash (the ID that can identify all the pieces of the first data), and that can identify the second data. More specifically, the trace data processing section 340 calculates HMAC (Hash-based Message Authentication Code) by using a message which is a concatenation of the public key of the second data and ParentsHash and the hash value of the second data as keys, and sets a result thereof as "ID." Note that "ID" is a concept that functions as the authentication code (information to be used for data authentication) depicted in FIG. 6 and FIG. 7.

By generating "ParentsHash" by using the IDs of the first data, a relation between the first data and the second data (i.e. a parent-child relation) can be represented more appropriately. Note that it is possible to examine that the parent-child relation is correct, by calculating a hash value of IDs of all the pieces of parent data whose signatures have been examined and comparing the calculated hash value with ParentsHash. In addition, because "ID" is dependent on the "hash value of the second data," the "public key of the second data," and "ParentsHash (i.e. the parent data)," for example, even in a case that there are multiple pieces of second data having identical parent data, "IDs" of the second data become mutually different, so that distinctions can be made between the multiple pieces of second data appropriately. That is, even in a case that a malicious third party has generated forgery data whose "ID" is identical to that of certain data, sensing of the forgery data can be realized more easily. By making "ID" dependent on a public key of second data, it is possible to sense forgery of a chain-like relation of data in a case that a malicious third party has given a signature to trace data of a child by using a key which is different from a private key that forms a pair with the public key of the second data. In addition, by generating "ID" by HMAC and keeping a hash value of data secret, it is possible to appropriately prevent ancestor data of the data corresponding to "ID" from being traced, so that this is useful in terms of privacy.

"ParentsHash" and "ID" generated by the generating apparatus 200 are explained. The trace data processing section 240 of the generating apparatus 200 generates "ParentsHash" (e.g. a hash value of the public key of the generating apparatus 200) by performing a calculation according to a cryptographic hash function by using the public key of the generating apparatus 200. In addition, the trace data processing section 240 adds, to the trace data, "ID" that is generated by performing a calculation according to a cryptographic hash function (e.g. MAC (Message Authentication Code), etc.) by using at least original data, a public key of the original data, and the public key of the generating apparatus 200, and that can identify the original data. More specifically, the trace data processing section 240 calculates HMAC (Hash-based Message Authentication Code) by using a message which is a concatenation of the public key of the original data and ParentsHash (data generated by using the public key of the generating apparatus 200) and the hash value of the original data as keys, and sets a result thereof as "ID."

FIG. 13 is a figure depicting a configuration example of digest information (DigestInfo) in the trace data (Trace Info). The trace data processing section 240 of the generating apparatus 200 associates digest information representing details of original data, with trace data, and the trace data processing section 340 of the processing apparatus 300 associates digest information representing details of second data, with trace data. As depicted in FIG. 13, the digest information (Digest Info) includes a data length (Digest length); a digest type representing a data format such as EXIF (Digest Type); digest data which is a copy of APP1 including EXIF (a thumbnail, etc.) or the like (Digest Data); and a hash value of the digest type (Digest Type) and the digest data (Digest Data) (Digest Hash). Note that Digest Hash can be said to be an ID that can identify the digest information, and Digest Hash is included in a certificate as a certification target.

That is, the certificate generating section 220 of the generating apparatus 200 and the certificate generating section 320 of the processing apparatus 300 include, in a certificate and as a certification target, Digest Hash (an ID that can identify the digest information) generated by performing a calculation according to a cryptographic hash function by using the digest information.

By associating the digest information with the trace data, a comparison between processing source data (first data) and processed data (second data) can be realized more easily. For example, by associating, as the digest information, EXIF or the like of the processing source data with the trace data, the examining apparatus 400 (not necessarily limited to this) can acquire the time of image-capturing, the location of image-capturing, a thumbnail, or the like of the processing source data that served as original data of the processed data, only by acquiring the processed data. In addition, even in a case that a malicious third party intentionally forges the processed data, the examining apparatus 400 (not necessarily limited to this) can decide whether or not there has been forgery, by deciding a similarity between a thumbnail of the processing source data and the processed data. For example, in a case that the similarity between the thumbnail of the processing source data and the processed data is lower than a predetermined threshold, it may be decided that the data has been forged. For example, in a decision related to the copyright of a photograph, it is possible to decide that the copyright of a processed photograph is owned by the owner of a camera, by comparing the processed photograph and digest information (a thumbnail, a three-dimensional distance image, etc.) of an original photograph included in trace data of the processed photograph, without acquiring the original photograph.

4.2. Configuration Example of Data Registered in P2P Database

Next, a configuration example of data registered in the P2P database 510 is explained.

FIG. 14 is a figure depicting a configuration example of the data information (DataRecord) explained with reference to FIG. 9. As depicted in FIG. 14, the data information (DataRecord) includes an identifier of data (dataID); an identifier of the owner of the data (ownerID); information of the copyright and license related to the data (rightsLicense); an identifier of a user who is a licensee according to a license agreement (licenseeID); and an array of IDs of child data of the data (childrenIDList). As explained in detail in the following paragraphs, in a case that an examination of the authenticity of data and an examination of tracing between pieces of data are successful, the data information (DataRecord) including an identifier (dataID) of the data whose authenticity has been examined is registered in the P2P database 510. An ID included in each piece of trace data in a series of a data group having a chain-like relation may also be registered, but this is not necessarily the sole example. In addition, in order to examine the copyright set for each piece of data, IDs of all ancestors are registered in the P2P database 510 in a case that a series of ancestor data is not registered in the P2P database 510. In this case, a tree (hierarchical structure) from original data down to all descendants can be constructed by registering also IDs of child data in an array of IDs of child data (childrenIDList), and the tree can be used for examining the copyright set for each piece of data. In addition, in a case that data information (DataRecord) including IDs has already been registered in the P2P database 510 in an examination of trace data, trace data of ancestor data before the data does not have to be examined. By registering, in the P2P database 510, not data itself but only the information depicted in FIG. 14, the amount of data registered in the P2P database 510 can be reduced.

FIG. 15 is a figure depicting a configuration example of the user information (UserRecord) explained with reference to FIG. 9. As depicted in FIG. 15, the user information (UserRecord) includes an identifier of a user (userID); the name of the user (name); attributes of the user (description; for example, an address, an email address, etc.); an identifier of the generating apparatus 200 owned by the user (e.g. a camera, etc.) (originatorIDList); and an address list of clients used in the P2P database 510 (addressList). The identifier of the generating apparatus 200 owned by the user is registered in the array of the identifier of the generating apparatus 200 (originatorIDList), and the public key of the generating apparatus 200 can be identified by referring to an associative array (OriginatorCertKeyList) of the public key of the generating apparatus 200 mentioned below.

FIG. 16 is a figure depicting a configuration example of a certificate of the public key of the generating apparatus 200 and the manufacturer. As depicted in FIG. 16, the certificate includes an identifier of a certification target (subject; an identifier of the camera which is the generating apparatus 200), the public key to be certified (publicKey; for example, the public key of the camera which is the generating apparatus 200, or the public key of the manufacturer); an identifier of an issuer of the certificate (issuer; for example, an identifier of the manufacturer of the camera which is the generating apparatus 200); and an electronic signature of the certificate (signature; a signature given to the above-mentioned configuration by using the private key S of the manufacturer).

FIG. 17 is a figure depicting a configuration example of an associative array registered in the P2P database 510. As depicted in FIG. 17, the P2P database 510 includes an associative array of a DataRecord value for an identifier of data (dataRecord); an associative array of a UserRecord value for the identifier of the user (userRecord); an associative array of a User identifier for an address of a client used in the P2P database 510 (userID); an associative array of a value of a public key of an identifier (subject in FIG. 16) of the generating apparatus 200 (e.g. a camera) (originatorKeyList); and an associative array of a Certificate value of the manufacturer (e.g. a camera manufacturer) of the generating apparatus 200 for a manufacturer identifier (the issuer in FIG. 16) (makerCertList). The user registers, in the P2P database 510, the certificate of the generating apparatus 200 acquired from the generating apparatus 200. In the associative array (makerCertList) of the Certificate value of the registered manufacturer, the P2P database 510 uses the certificate to examine the certificate of the generating apparatus 200, registers the public key of the generating apparatus 200 and a certification target identifier in the associative array (originatorKeyList), and registers the certification target identifier included in Subject, as an identifier of the camera, in the associative array (originatorKeyList) of relevant user information. Note that the associative array (makerCertList) of the Certificate value of the manufacturer of the P2P database 510 can be rewritten only with an address of a client having a special right.

5. Copyrights

In the description above, the configuration example of the data generated by each apparatus (or data stored by each apparatus) has been explained. Next, a copyright which is metadata related to data according to the present embodiment is explained.

The information processing system according to the present embodiment can also manage the copyright or license of each piece of data. More specifically, the information processing system according to the present embodiment manages copyright information (rightsLicense in FIG. 14) of each piece of data by registering the copyright information in the P2P database 510 as data information (DataRecord).

FIG. 18 is a figure depicting a list related to copyrights according to the present embodiment. The list includes defined values, values to be used in a program, and copyright contents. Note that what are depicted in FIG. 18 are merely an example, and copyrights used in the present embodiment are not limited to them.

It is assumed in the present embodiment that, because there is a parent-child relation between pieces of data, copyrights or licenses that are stricter (more restricted) than those for parent data cannot be set for child or descendant data. In other words, copyrights set for child or descendant data are as strict as or are not stricter than those for parent data. Because of the existence of such a copyright setting rule, it is possible to correctly determine whether or not the copyright of data that a user is attempting to register is appropriate in relation to a descendant tree from original data registered in the P2P database 510, on the basis of copyright information registered in the P2P database 510. Explaining more specifically, because a chain-like relation between pieces of data can be recognized on the basis of trace data added to each piece of data, if copyright information related to original data that is positioned at the uppermost position is registered in the P2P database 510, it is possible to correctly determine whether or not the copyright of child data is appropriate, on the basis of the copyright setting rule. In a case that data information (DataRecord) of ancestor data including the original data is registered in the P2P database 510 and that NoLicensSpecified (the value 0 in FIG. 18) representing that a copyright is not set is set as copyright information (rightsLicense in FIG. 14), it may be determined that AllRightReserved (the value 6 in FIG. 18), which is a default copyright, is set. Note that the copyright setting rule regarding each piece of data is not necessarily limited to this.

6. Process Flow Example of Each Apparatus

In the description above, the copyrights according to the present embodiment have been explained. Next, a process flow example of each apparatus is explained.

6.1. Flow of Data Processing Performed by Processing Apparatus 300

First, a flow of data processing performed by the processing apparatus 300 is explained with reference to FIG. 19. FIG. 19 is a flowchart depicting an example of the flow of the data processing performed by the processing apparatus 300.

In Step S1000, the trace data processing section 340 reads and analyzes a processing source file. In Step S1004, the data processing section 310 generates second data by processing data (first data) included in the processing source file. In a case that Origin Trace Data has been added to the processing source file (i.e. in a case that the processing source file is one generated by an apparatus according to the present embodiment; Step S1008/Yes), Origin Trace Data of the second data is generated in Step S1012. A flow of a process to generate Origin Trace Data of the second data is explained in detail with reference to FIG. 20 and FIG. 21 in the following paragraphs. In Step S1016, the trace data processing section 340 adds Origin Trace Data of the second data to the second data and generates a file. Then, the series of processing ends. Note that, in a case that Origin Trace Data has not been added to the processing source file in Step S1008 (i.e. in a case that the processing source file is not one generated by an apparatus according to the present embodiment; Step S1008/No), the processes in Step S1012 and Step S1016 are omitted.

Figure 20:
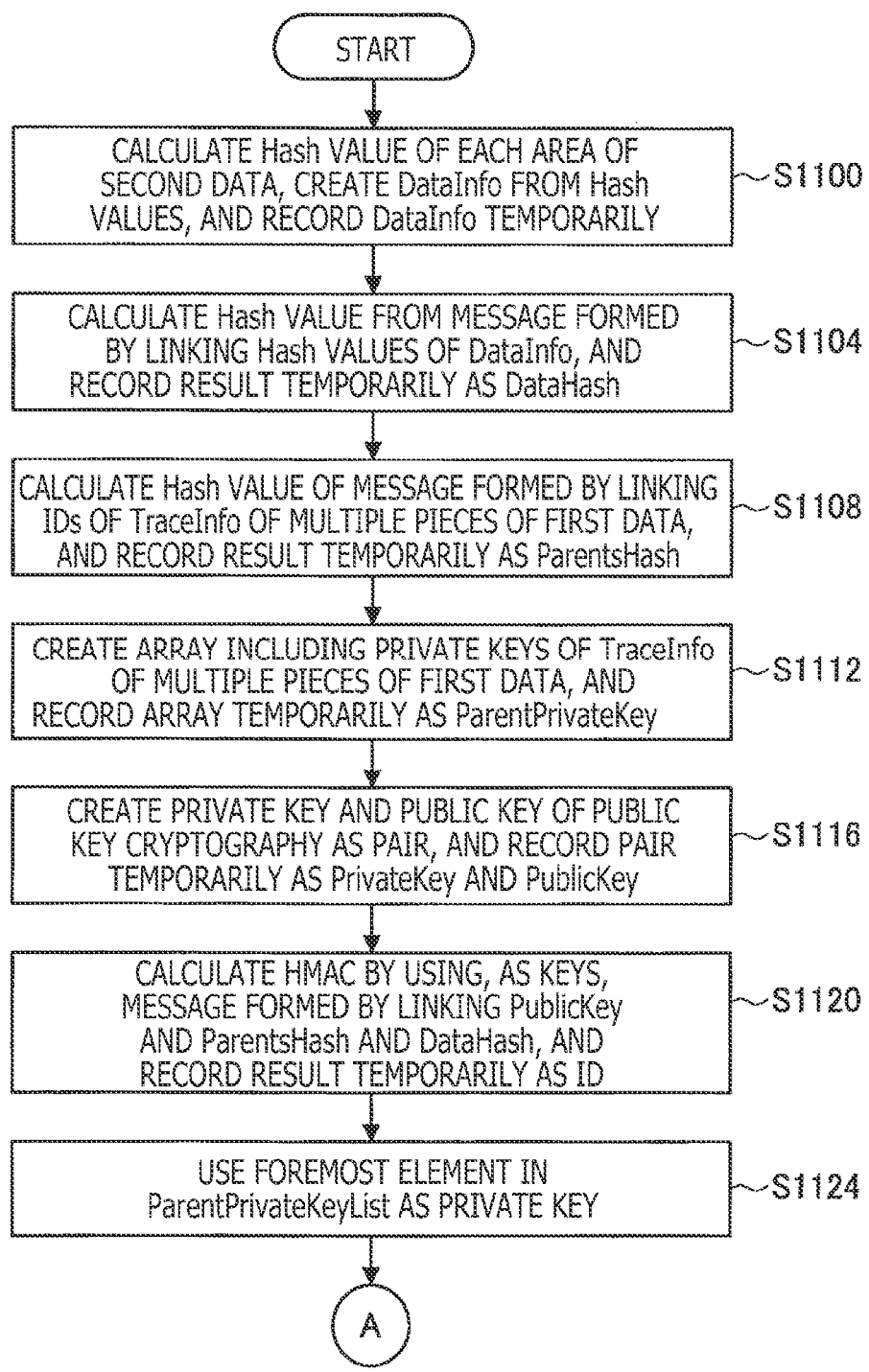
FIG. 20 is a flowchart depicting an example of a flow of a process to generate Origin Trace Data of second data that is performed by the processing apparatus.
Figure 21:
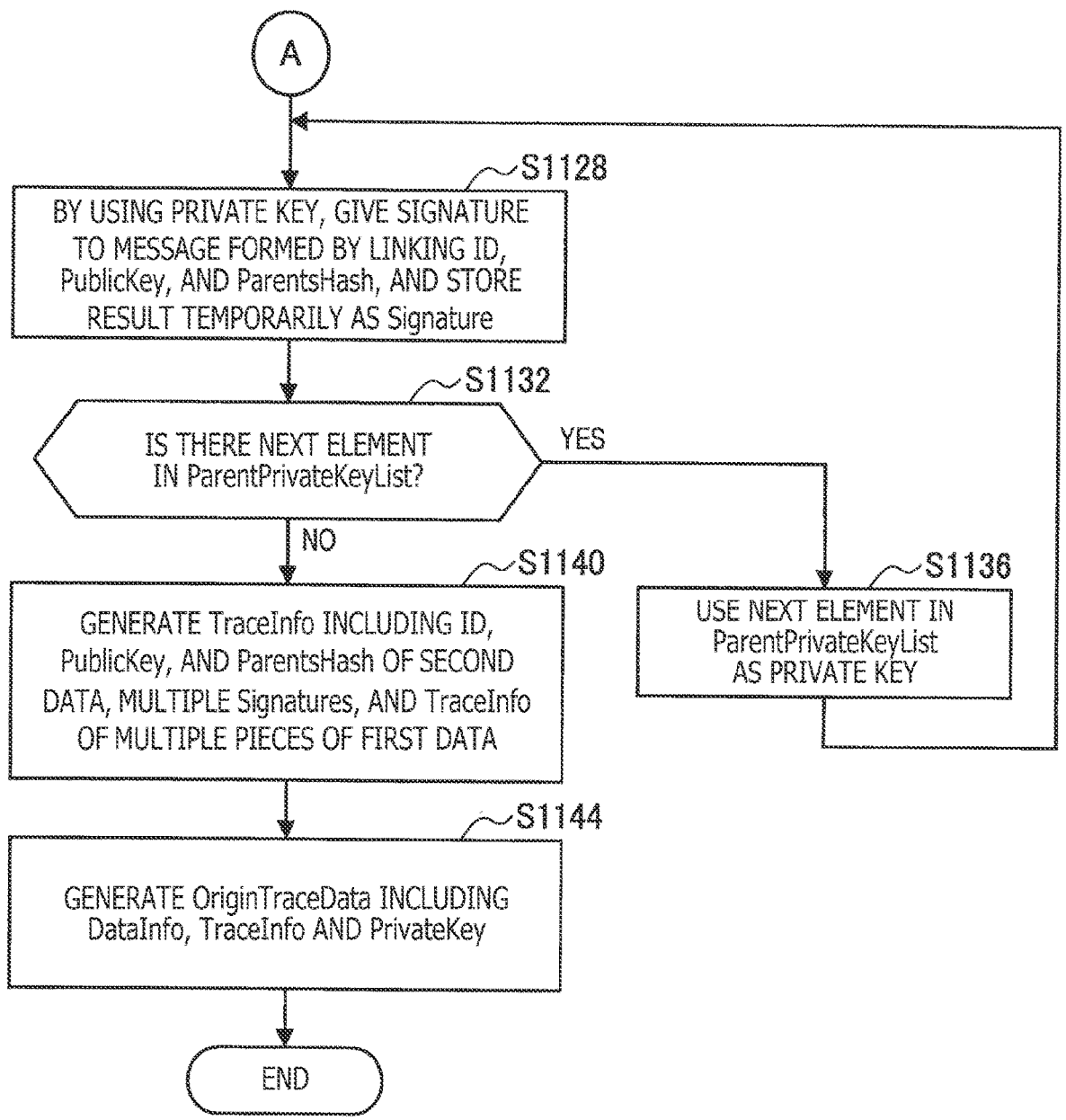
FIG. 21 is a flowchart depicting the example of the flow of the process to generate Origin Trace Data of the second data that is performed by the processing apparatus.

Next, a flow of a process to generate Origin Trace Data of second data is explained with reference to FIG. 20 and FIG. 21. FIG. 20 and FIG. 21 are flowcharts depicting an example of the flow of the process to generate Origin Trace Data of the second data that is performed by the processing apparatus 300. Note that, in FIG. 20 and FIG. 21 and a procedure described below, in a case that there are multiple processing source files, the files are denoted as "multiple pieces of first data," and in a case that there is one processing source file, the file is denoted as "first data."

In Step S1100, the trace data processing section 340 of the processing apparatus 300 calculates a Hash value of each area of the second data, and creates and temporarily records data information (DataInfo) from the calculated Hash value. In Step S1104, the trace data processing section 340 further calculates a Hash value from a message which is a concatenation of the Hash values of the data information (DataInfo), and temporarily records a result thereof as DataHash. In Step S1108, the trace data processing section 340 calculates a Hash value of a message which is a concatenation of IDs of trace data (Trace Info) of multiple pieces of first data, and temporarily records a result thereof as ParentsHash. In Step S1112, the trace data processing section 340 creates an array including private keys of the trace data (Trace Info) of the multiple pieces of first data and temporarily records the array as ParentPrivateKey.

In Step S1116, the key generating section 330 creates a private key and a public key of public key cryptography as a pair and temporarily records the private key and the public key as PrivateKey and PublicKey. In Step S1120, the trace data processing section 340 calculates HMAC by using a message which is a concatenation of PublicKey and ParentsHash and DataHash as keys, and temporarily records a result thereof as an ID. In Step S1124, the certificate generating section 320 sets the foremost element in ParentPrivateKeyList as a private key. In Step S1128, the certificate generating section 320 gives a signature to a message which is a concatenation of ID, PublicKey, ParentsHash, and the like, by using the private key, and temporarily stores a result thereof as Signature.

In a case that there is the next element in ParentPrivateKeyList (i.e. in a case that there is unprocessed parent data; Step S1132/Yes), the certificate generating section 320 sets the next element in ParentPrivateKeyList as a private key in Step S1136 and repeats the process to give a signature in Step S1128. In a case that there is not the next element in ParentPrivateKeyList (i.e. in a case that there is no unprocessed parent data; Step S1132/No), the trace data processing section 340 generates, in Step S1140, Trace Info including ID of the second data, PublicKey of the second data, ParentHash of the second data, multiple Signatures, and TraceInfo of the multiple pieces of first data. In Step S1144, the trace data processing section 340 generates Origin Trace Data including DataInfo, Trace Info, and PrivateKey. Then, the series of processing ends.

6.2. Flow of Process to Register UserRecord that is Performed by P2P Database Program 511

Figure 22:
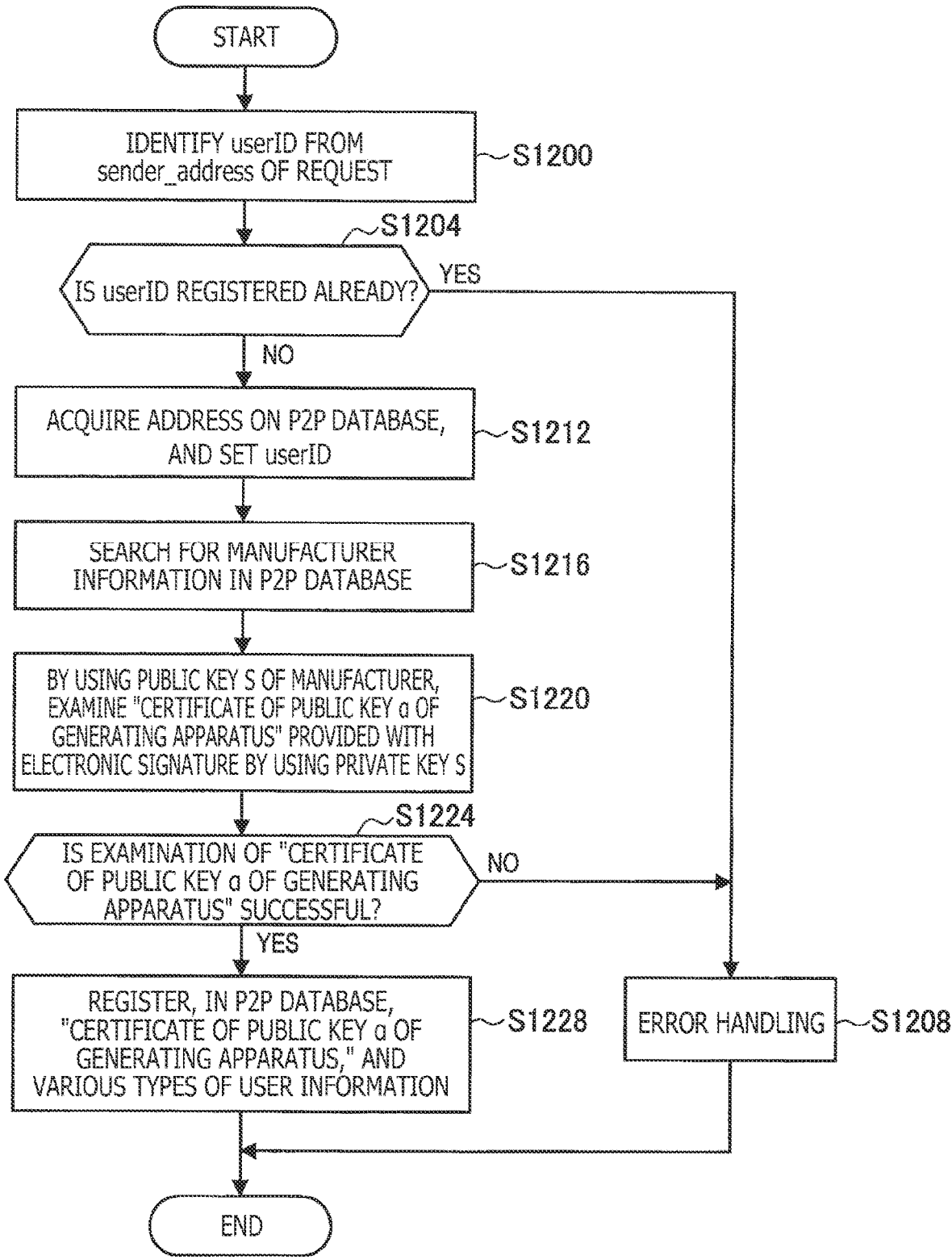
FIG. 22 is a flowchart depicting an example of a flow of a process to register UserRecord that is performed by a P2P database program.

Next, a flow of a process to register UserRecord is explained with reference to FIG. 22. FIG. 22 is a flowchart depicting an example of the flow of the process to register UserRecord that is performed by the P2P database program 511.

In Step S1200, the node apparatus 500 receives a registration request for UserRecord from an external apparatus and identifies userID by referring to an associative array (userID) on the basis of sender_address included in the request. In a case that userID has already been registered in the associative array (userID) of the P2P database 510 (Step S1204/Yes), the P2P database program 511 performs predetermined error handling in Step S1208. For example, the P2P database program 511 notifies a sender apparatus of the registration request that userID has already been registered.

In a case that userID has not been registered in the associative array (userID) of the P2P database 510 yet (Step S1204/No), the P2P database program 511 acquires an address of a target user used at the P2P database 510 and sets userID in the associative array (userID) in Step S1212. Note that the address is one that also functions as Wallet that manages the asset of the target user. Because the user owns multiple addresses in some cases, when unique userID is set to the multiple addresses, it becomes possible to manage the user by using userID (i.e. without being dependent on particular Wallet, it becomes possible to provide services by using addresses of multiple Wallets).

In Step S1216, the P2P database program 511 searches for manufacturer information in the P2P database 510. In Step S1220, by referring to the associative array (makerCertList) of the P2P database 510 as the manufacturer information and using the public key S of the manufacturer, the examining section 511a examines a "certificate of the public key a of the generating apparatus 200" which is included in the registration request and to which an electronic signature is given by using the private key S of the manufacturer. In a case that the examination of the "certificate of the public key a of the generating apparatus 200" is successful (Step S1224/Yes), in Step S1228, the P2P database program 511 registers, in the associative array (originatorKeyList) of the P2P database 510, the public key included in the "certificate of the public key a of the generating apparatus 200" and registers an identifier of the key in the associative array (originatorKeyList) of the user information (UserRecord). Then, the series of processing ends. In a case that the examination of the "certificate of the public key a of the generating apparatus 200" is unsuccessful (Step S1224/No), the P2P database program 511 performs predetermined error handling in Step S1208. Then, the series of processing ends.

6.3. Flow of Process to Register DataRecord that is Performed by P2P Database Program 511

Figure 23:
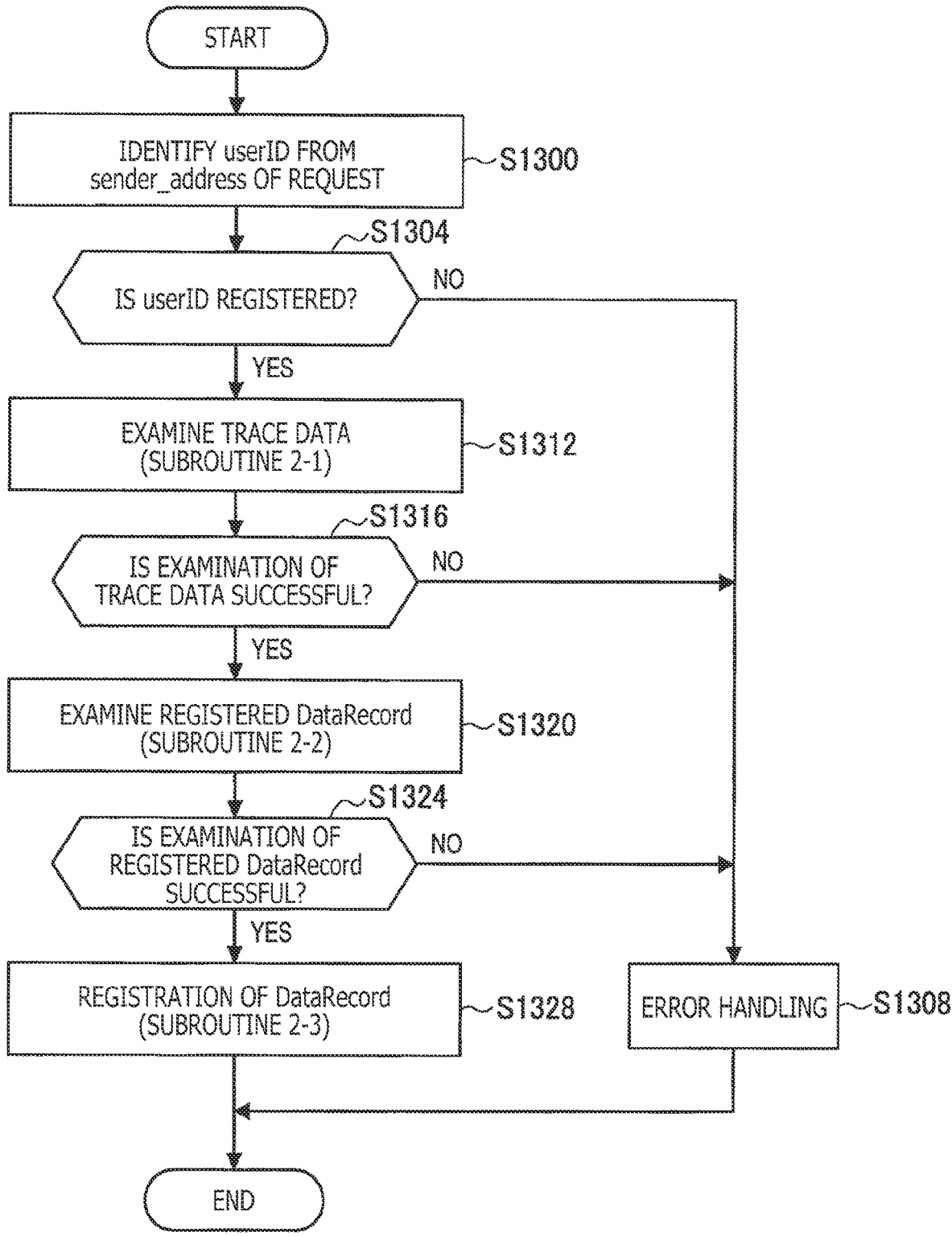
FIG. 23 is a flowchart depicting an example of a flow of a process to register DataRecord that is performed by the P2P database program.

Next, a flow of a process to register DataRecord is explained with reference to FIG. 23. FIG. 23 is a flowchart depicting an example of the flow of the process to register DataRecord that is performed by the P2P database program 511.

In Step S1300, the node apparatus 500 receives a registration request for DataRecord from an external apparatus and identifies userID by referring to an associative array (userID) on the basis of sender_address included in the request. In a case that userID has not been registered in the associative array (userID) of the P2P database 510 (Step S1304/No), the P2P database program 511 performs predetermined error handling in Step S1308.

In a case that userID has been registered in the associative array (userID) of the P2P database 510 (Step S1304/Yes), the examining section 511a examines trace data (subroutine 2-1) in Step S1312. More specifically, the examining section 511a examines whether or not certificates of all pieces of trace data (Trace Info) added to the data are correct. The subroutine 2-1 is explained in detail in the following paragraphs (the same applies to other subroutines).

In a case that the examination of the trace data is successful (Step S1316/Yes), the examining section 511a examines registered DataRecord (subroutine 2-2) in Step S1320. More specifically, the examining section 511a examines whether or not a copyright rule, owner setting, and the like are correct, by using the registered data information (DataRecord). In a case that the examination of registered DataRecord is successful (Step S1324/Yes), the examining section 511a registers DataRecord (subroutine 2-3) in Step S1328. More specifically, after the examination of the certificate in the previous stage, the examining section 511a that functions as a registering section registers, in the P2P database 510, an ID that can identify the second data or an ID that is included in the trace data and can identify each piece of data.

Note that, in a case that the examination of the trace data is unsuccessful in Step S1316 (Step S1316/No) and in a case that the examination of registered DataRecord is unsuccessful in Step S1324 (Step S1324/No), the P2P database program 511 performs predetermined error handling in Step S1308. Then, the series of processing ends.

6.4. Flow of Process to Examine Trace Data Performed by P2P Database Program 511

Figure 24:
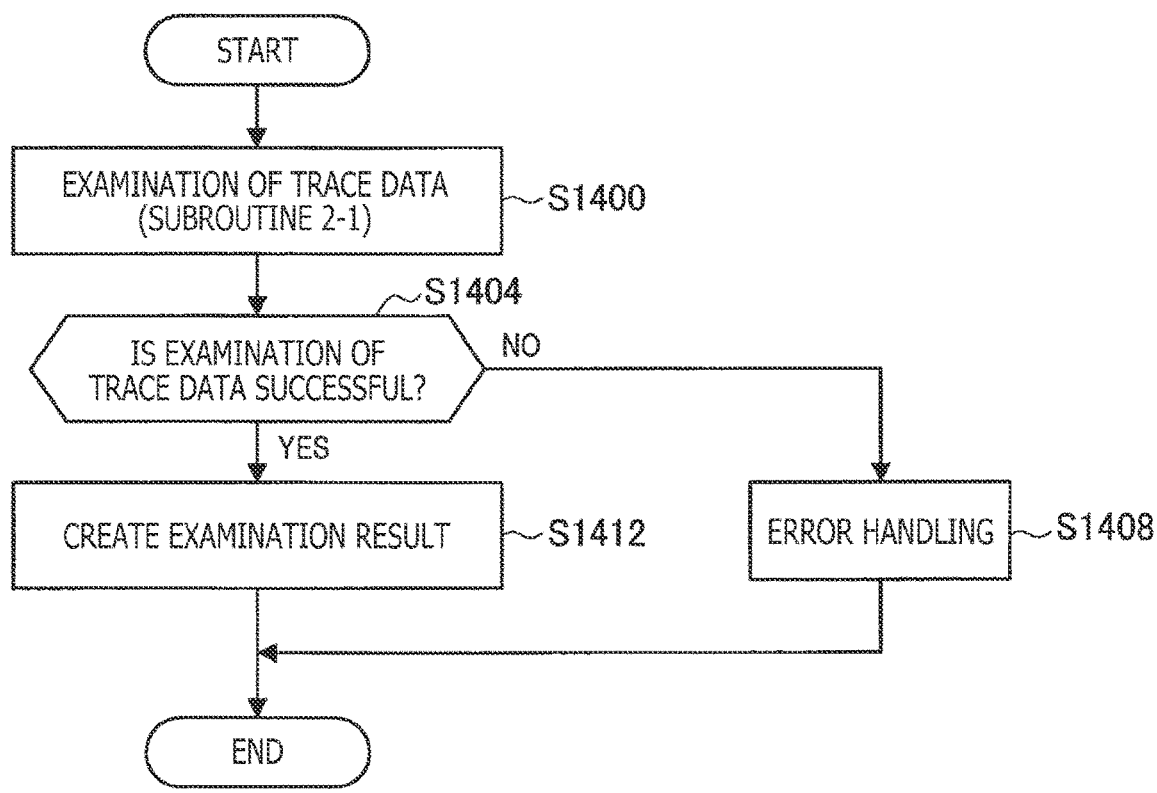
FIG. 24 is a flowchart depicting an example of a flow of a process to examine the trace data that is performed by an examining section.

Next, a flow of a process to examine trace data is explained with reference to FIG. 24. FIG. 24 is a flowchart depicting an example of the flow of the process to examine the trace data that is performed by the examining section 511a included in the P2P database program 511. For example, the following process is performed according to an examination request of a user who intends to check the authenticity, a parent-child relation, or the like of certain data.

In Step S1400, for example, on the basis of the examination request from the user, the examining section 511a examines trace data (subroutine 2-1). In a case that the examination of the trace data is unsuccessful (Step S1404/No), the P2P database program 511 performs predetermined error handling in Step S1408. Then, the series of processing ends. In a case that the examination of the trace data is successful (Step S1404/Yes), the examining section 511a creates an examination result of the trace data in Step S1412. Then, the series of processing ends. More specifically, the examining section 511a gathers, as the examination result of the trace data, copyright information related to the examination target data and ancestor data (rightsLicense in FIG. 14), an identifier of the owner (ownerID in FIG. 14), an identifier of a user who is a licensee according to a license agreement (licenseeID in FIG. 14), and the like.

6.5. Flow of Process to Acquire UserRecord that is Performed by P2P Database Program 511

Figure 25:
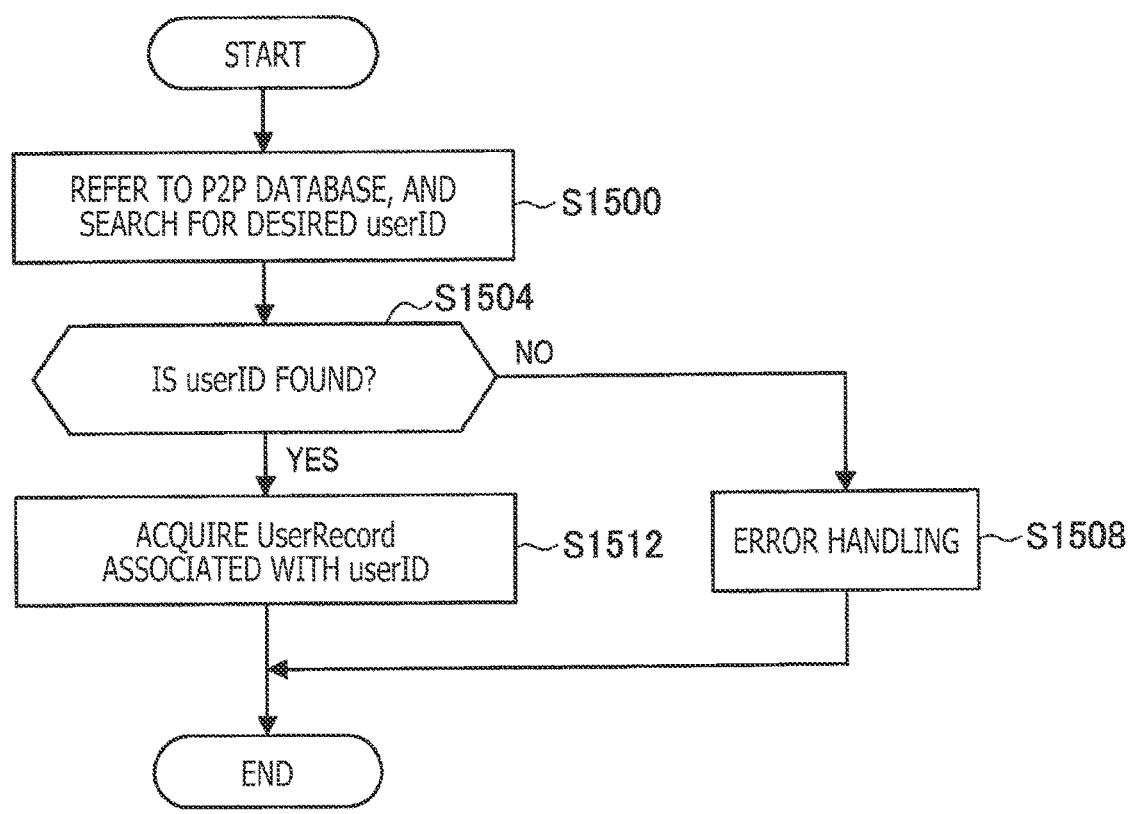
FIG. 25 is a flowchart depicting an example of a flow of a process to acquire UserRecord that is performed by the P2P database program.

Next, a flow of a process to acquire UserRecord is explained with reference to FIG. 25. FIG. 25 is a flowchart depicting an example of the flow of the process to acquire UserRecord that is performed by the P2P database program 511. For example, the following process is performed according to an acquisition request of another user who intends to check details of a user corresponding to the identifier of the owner or the identifier of the user who is the licensee according to the license agreement, the identifier of the owner and the identifier of the user being included in the examination result of the trace data obtained as described in FIG. 24.

In Step S1500, the P2P database program 511 refers to the P2P database 510 and searches for desired userID specified by the acquisition request from the user, for example, by referring to an associative array (userRecord). In a case that UserRecord including userID is not found (Step S1504/No), the P2P database program 511 performs predetermined error handling in Step S1508. Then, the series of processing ends. In a case that UserRecord including userID is found (Step S1504/Yes), the P2P database program 511 acquires UserRecord associated with userID, from the P2P database 510 in Step S1512. Then, the series of processing ends.

6.6. Flow of Process to Acquire DataRecord that is Performed by P2P Database Program 511

Figure 26:
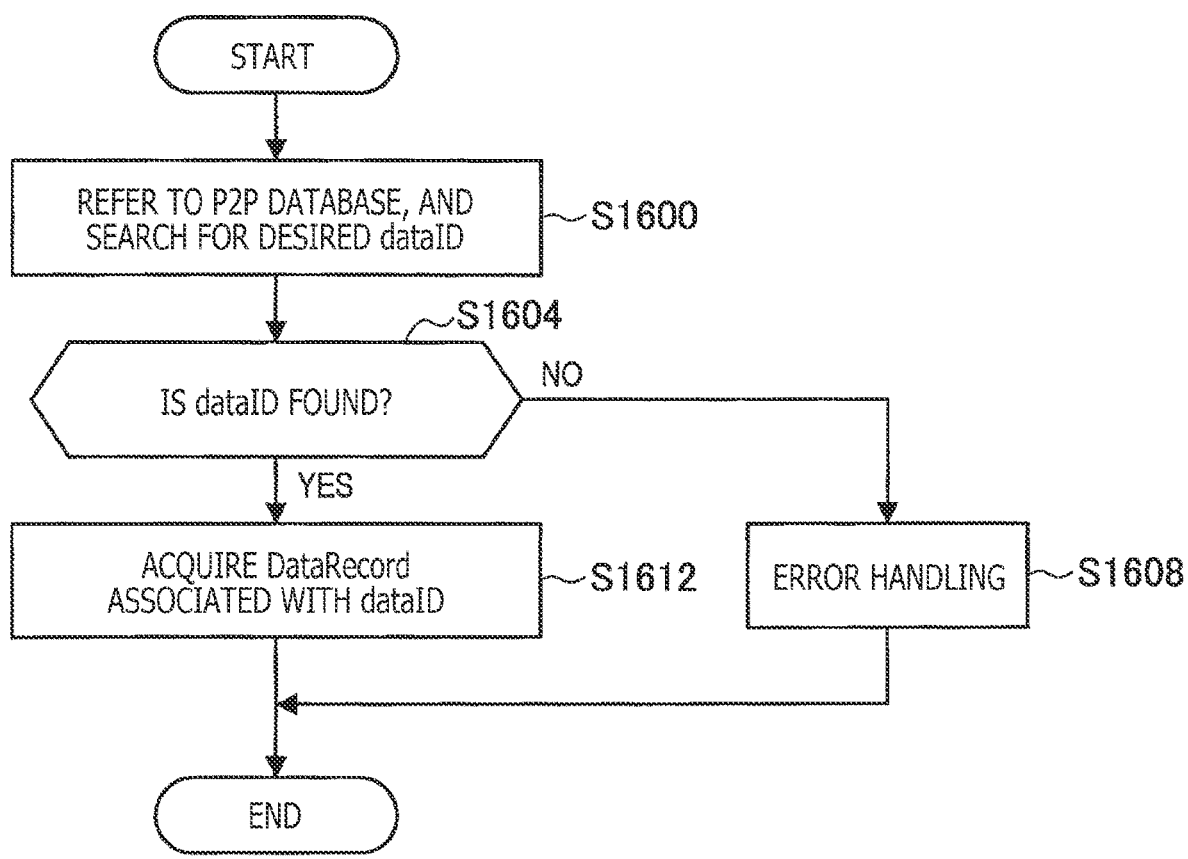
FIG. 26 is a flowchart depicting an example of a flow of a process to acquire DataRecord that is performed by the P2P database program.

Next, a flow of a process to acquire DataRecord is explained with reference to FIG. 26. FIG. 26 is a flowchart depicting an example of the flow of the process to acquire DataRecord that is performed by the P2P database program 511. For example, the following process is performed according to an acquisition request of a user who intends to check details of certain data.

In Step S1600, the P2P database program 511 refers to the P2P database 510 and searches for desired dataID specified by the acquisition request from the user, for example, by referring to an associative array (dataRecord). In a case that DataRecord including dataID is not found (Step S1604/No), the P2P database program 511 performs predetermined error handling in Step S1608. Then, the series of processing ends. In a case that DetaRecord including dataID is found (Step S1604/Yes), the P2P database program 511 acquires DataRecord associated with dataID, from the P2P database 510 in Step S1612. Then, the series of processing ends.

6.7. Flow of Process to Examine Trace Data (Subroutine 2-1)

Figure 27:
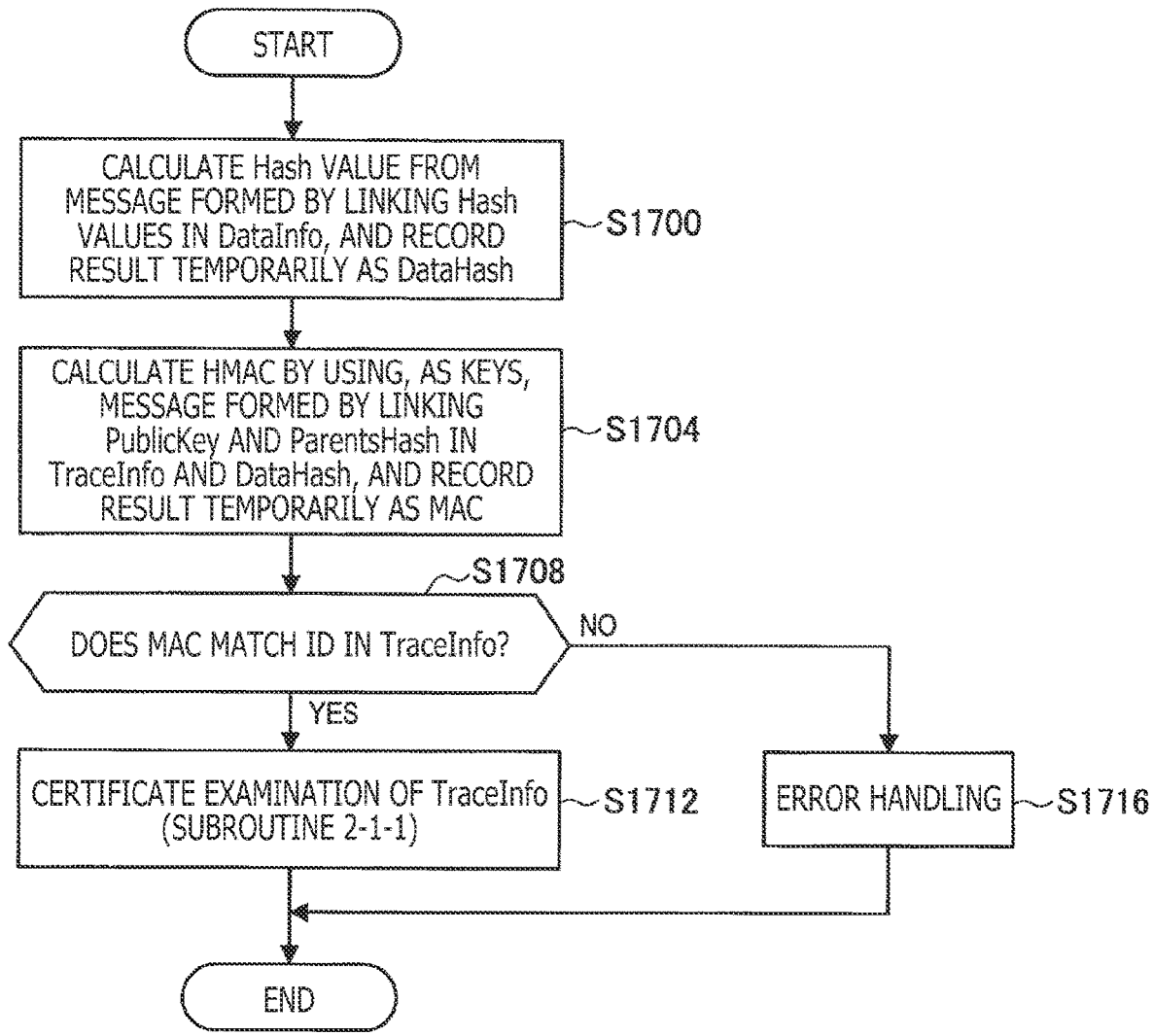
FIG. 27 is a flowchart depicting an example of a flow of a process to examine the trace data (subroutine 2-1) that is performed in FIG. 23 and FIG. 24.

Next, a flow of a process to examine the trace data (subroutine 2-1) is explained with reference to FIG. 27. FIG. 27 is a flowchart depicting an example of the flow of the process to examine the trace data, which is performed in FIG. 23 and FIG. 24.

In Step S1700, the examining section 511*a* calculates a Hash value by using a message which is a concatenation of Hash values in DataInfo in Origin Trace Data, and temporarily records a result thereof as DataHash. In Step S1704, the examining section 511*a* calculates HMAC by using a message which is a concatenation of PublicKey and ParentsHash in TraceInfo in Origin Trace Data and DataHash as keys, and temporarily records a result thereof as MAC (i.e. the examining section 511*a* calculates MAC by using a hash value of second data, a public key of the second data, and a hash value of an ID that can identify first data).

In Step S1708, the examining section 511*a* examines that MAC matches an ID in TraceInfo. Note that the examination process can be said to be a process in which the examining section 511*a* examines that an ID which is generated by performing a calculation according to a cryptographic hash function by using at least second data (DataHash generated by using the second data), a public key (PublicKey) of the second data, and IDs (ParentsHash) that can identify all pieces of first data, and which can identify the second data matches an ID which is included in the trace data and can identify the second data. In a case that MAC matches the ID in TraceInfo (Step S1708/Yes), the examining section 511*a* performs a certificate examination of TraceInfo (subroutine 2-1-1) in Step S1712. More specifically, the examining section 511*a* examines whether or not all certificates related to ancestor data included in TraceInfo are correct. Then, the series of processing ends. In a case that MAC does not match the ID in TraceInfo (Step S1708/No), the examining section 511*a* performs predetermined error handling in Step S1716. Then, the series of processing ends.

6.8. Flow of Process to Examine Certificate of TraceInfo (Subroutine 2-1-1)

Figure 28:
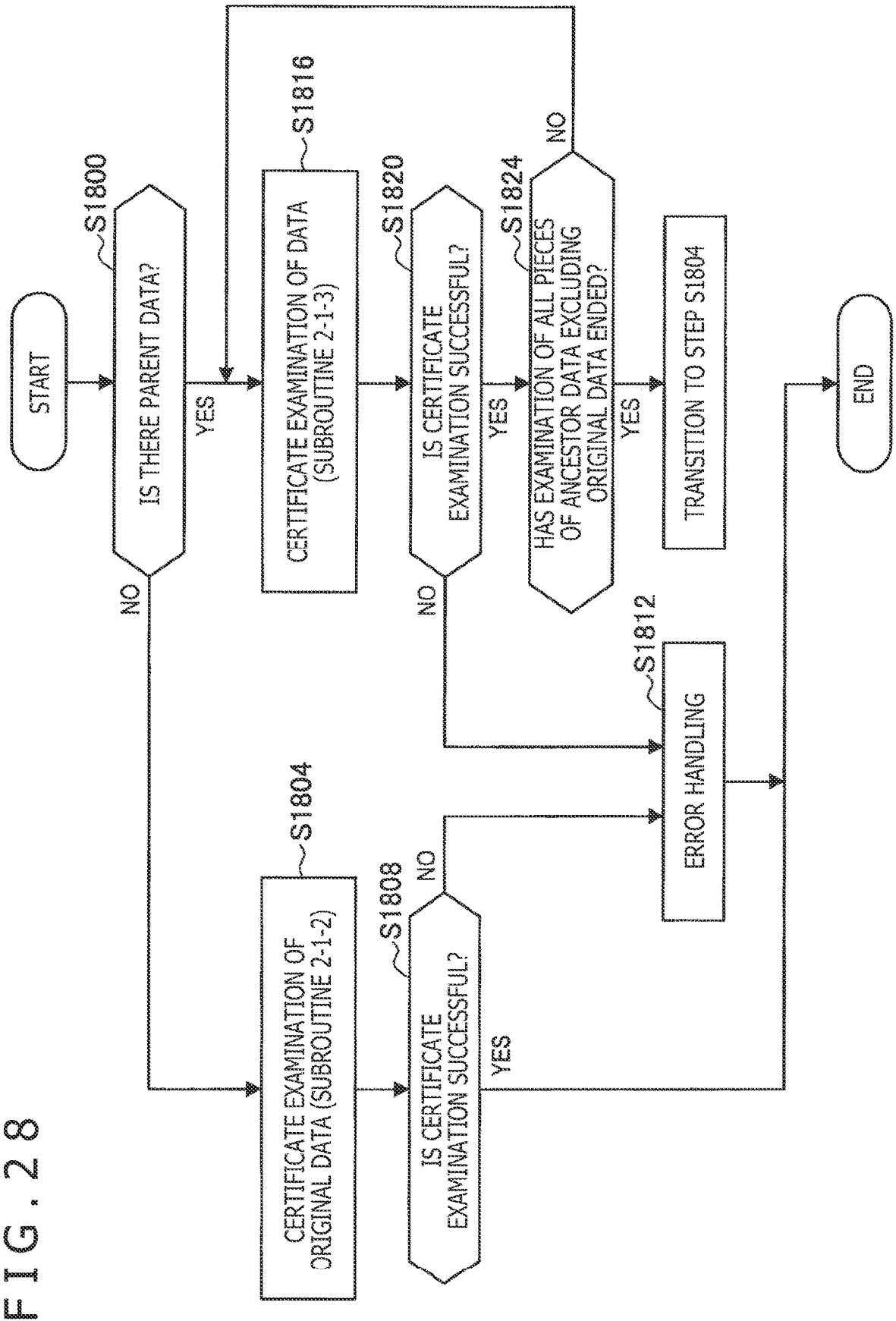
FIG. 28 is a flowchart depicting an example of a flow of a process to examine a certificate of TraceInfo (subroutine 2-1-1) that is performed in FIG. 27.

Next, a flow of a process to examine a certificate of TraceInfo (subroutine 2-1-1) is explained with reference to FIG. 28. FIG. 28 is a flowchart depicting an example of the flow of the process to examine the certificate of TraceInfo, which is performed in FIG. 27.

In a case that there is no parent data of examination target data (i.e. in a case that examination target data is original data; Step S1800/No), the examining section 511*a* performs a certificate examination (subroutine 2-1-2) of the original data in Step S1804. More specifically, the examining section 511*a* examines the certificate of the original data by using the public key a of the generating apparatus 200 that is registered in the P2P database 510. In a case that the examination of the certificate of the original data is successful (Step S1808/Yes), the series of processing ends. In a case that the examination of the certificate of the original data is unsuccessful (Step S1808/No), the examining section 511*a* performs predetermined error handling in Step S1812. Then, the series of processing ends.

In a case that there is parent data of the examination target data (Step S1800/Yes), the examining section 511*a* performs a certificate examination (subroutine 2-1-3) of the data in Step S1816. More specifically, by using a public key of first data (parent data) included in a certificate added to the first data, the examining section 511*a* examines the certificate to which an electronic signature is given by using a private key of the first data included in the trace data (the certificate in relation to the child data). In a case that the examination of the certificate of the data is unsuccessful (Step S1820/No), the examining section 511*a* performs predetermined error handling in Step S1812. Then, the series of processing ends.

In a case that the examination of the certificate of the data is successful (Step S1820/Yes), on the basis of the trace data, the examining section 511*a* decides in Step S1824 whether or not examinations of certificates of all pieces of ancestor data excluding the original data have ended. In a case that the examinations of the certificates of all the pieces of the ancestor data excluding the original data have ended (Step S1824/Yes), the process proceeds to Step S1804, and the examining section 511*a* then performs a certificate examination (subroutine 2-1-2) of the original data. Thereafter, the process ends. In a case that the examinations of the certificates of all the pieces of the ancestor data excluding the original data have not ended (Step S1824/No), the process proceeds to Step S1816, and the examining section 511*a* repeats certificate examinations of data (subroutine 2-1-3) until the examinations of the certificates of all the pieces of the ancestor data excluding the original data end.

6.9. Certificate Examination of Original Data (Subroutine 2-1-2)

Figure 29:
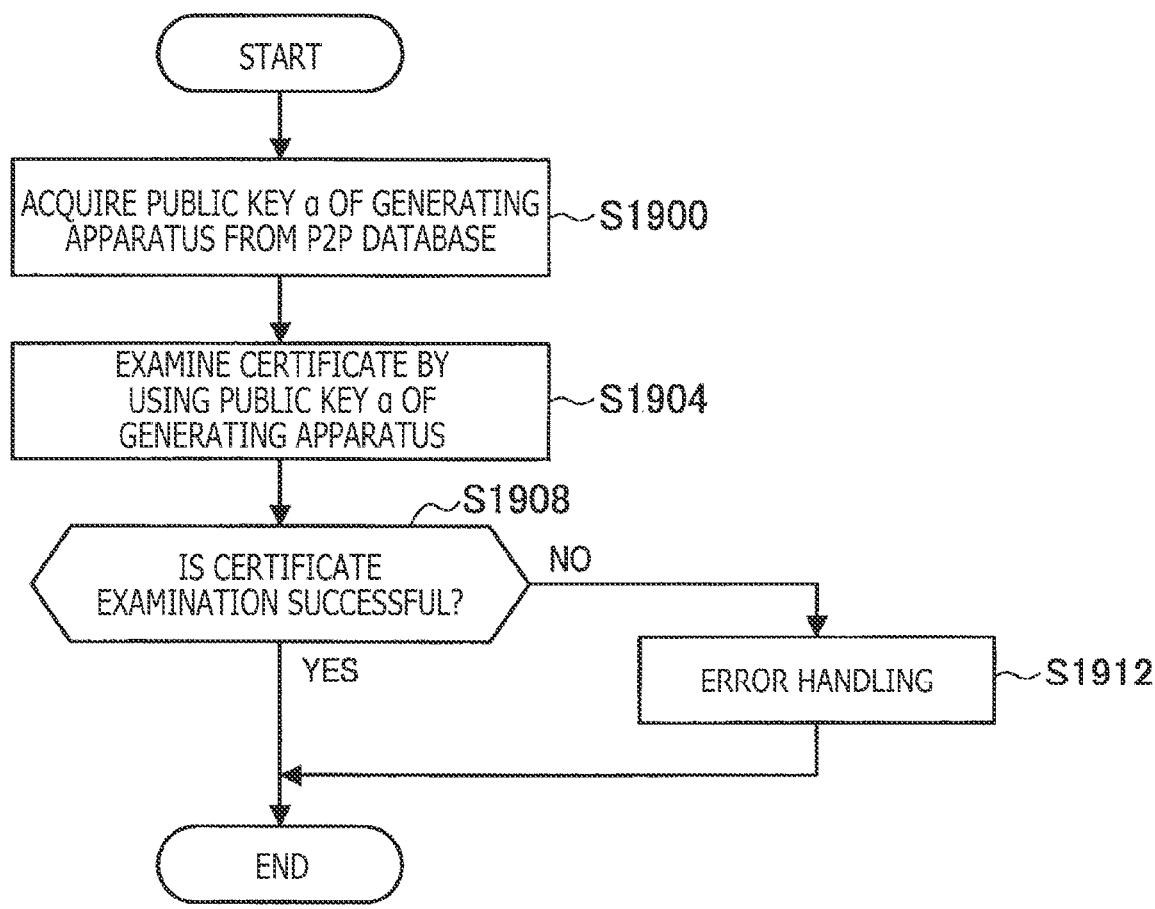
FIG. 29 is a flowchart depicting an example of a flow of a process to examine a certificate of original data (subroutine 2-1-2) that is performed in FIG. 28.

Next, a certificate examination of original data (subroutine 2-1-2) is explained with reference to FIG. 29. FIG. 29 is a flowchart depicting an example of a flow of the process to examine a certificate of the original data, which is performed in FIG. 28.

In Step S1900, the examining section 511*a* acquires the public key a of the generating apparatus 200 from the P2P database 510. In Step S1904, the examining section 511*a* examines a certificate of original data by using the public key a of the generating apparatus 200. In other words, for the examination of the certificate included in trace data of the original data, the examining section 511*a* uses the public key a that is registered in the P2P database 510 and is of the generating apparatus 200 of the original data. Because ParentHash included in the trace data of the original data is a hash value (an identifier of the generating apparatus 200) of the public key of the generating apparatus 200, the certificate of the original data can be examined by obtaining the public key referring to the associative array (originatorKeyList). In a case that the examination of the certificate of the original data is successful (Step S1908/Yes), the series of processing ends. In a case that the examination of the certificate of the original data is unsuccessful (Step S1908/No), the examining section 511a performs predetermined error handling in Step S1912. Then, the series of processing ends.

6.10. Certificate Examination of Data (Subroutine 2-1-3)

Figure 30:
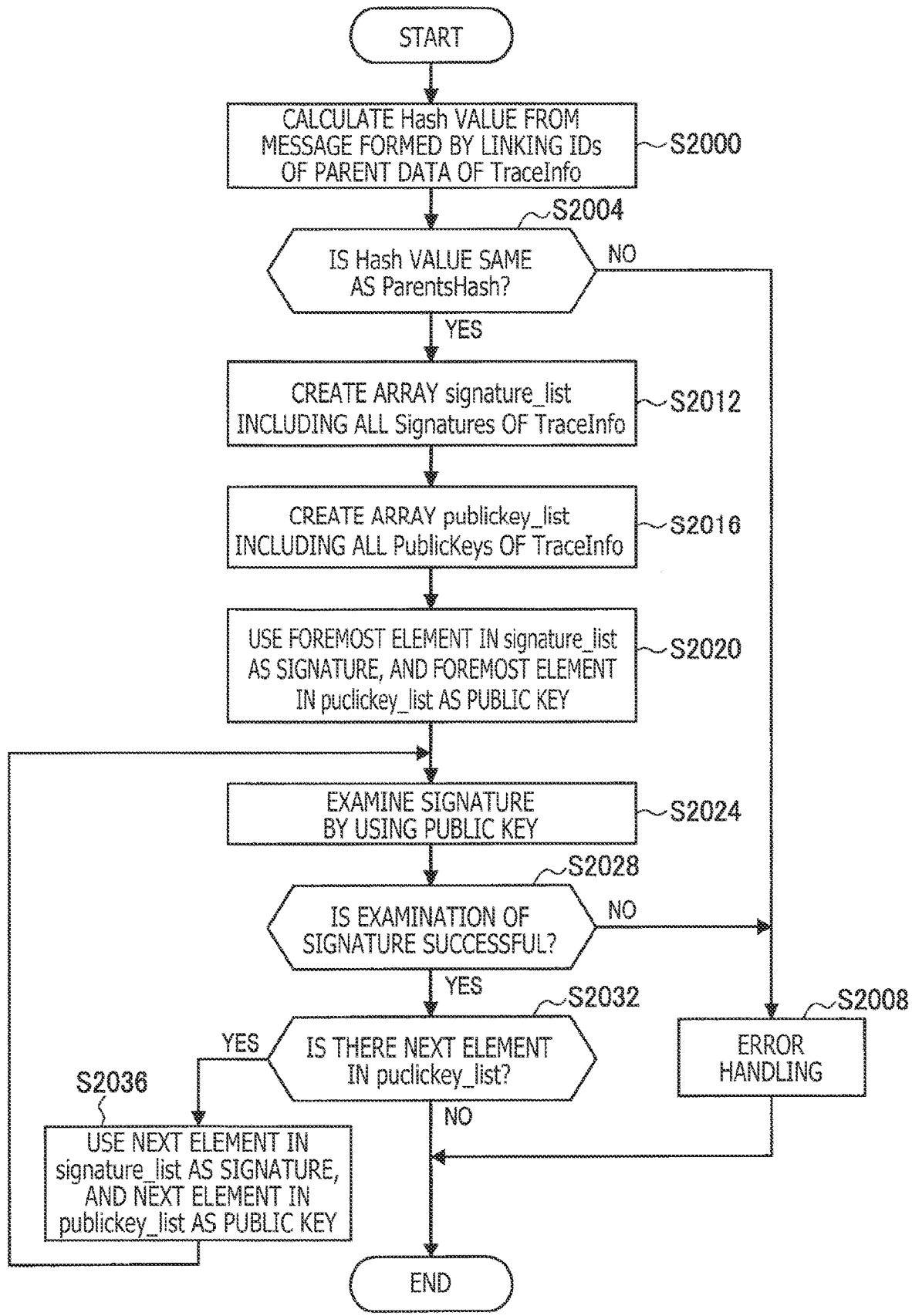
FIG. 30 is a flowchart depicting an example of a flow of a process to examine a certificate of data (subroutine 2-1-3) that is performed in FIG. 28.

Next, a certificate examination of data (subroutine 2-1-3) is explained with reference to FIG. 30. FIG. 30 is a flowchart depicting an example of a flow of the process to examine a certificate of the data, which is performed in FIG. 28.

In Step S2000, the examining section 511a calculates a Hash value from a message which is a concatenation of IDs of at least one or more pieces of parent data in TraceInfo (i.e. a hash value of an ID which is generated by performing a calculation according to a cryptographic hash function by using IDs that can identify at least one or more pieces of first data, and which can identify the first data). Then, in Step S2004, the examining section 511a decides whether or not the Hash value is equal to ParentsHash in TraceInfo. In a case that the Hash value is not equal to ParentsHash in TraceInfo (Step S2004/No), the examining section 511a perform predetermined error handling in Step S2008. Then, the series of processing ends. In a case that the Hash value is equal to ParentsHash in TraceInfo (Step S2004/Yes), the examining section 511a creates an array signature_list including all Signatures of TraceInfo in Step S2012. In Step S2016, the examining section 511a creates an array publickey_list including all PublicKeys of TraceInfo. In Step S2020, the examining section 511a sets the foremost element in signature_list as a signature, and sets the foremost element in publickey_list as a public key.

In Step S2024, the examining section 511a examines the signature by using the public key. In a case that the examination of the signature is successful (Step S2028/Yes), the examining section 511a checks in Step S2032 whether or not there is the next element in publickey_list. In a case that there is the next element in publickey_list (Step S2032/Yes), in Step S2036, the examining section 511a sets the next element in signature_list as a signature, and the next element in publickey_list as a public key, and repeats the processes in Step S2024 to Step S2032, and then, the series of processing ends. In such a manner, the examining section 511a performs examinations of signatures of all pieces of parent data of the examination target data. Note that, in a case that the examination of the signature is unsuccessful in Step S2028 (Step S2028/No), the examining section 511a performs predetermined error handling in Step S2008. Then, the series of processing ends.

6.11. Examination of Registered DataRecord (Subroutine 2-2)

Figure 31:
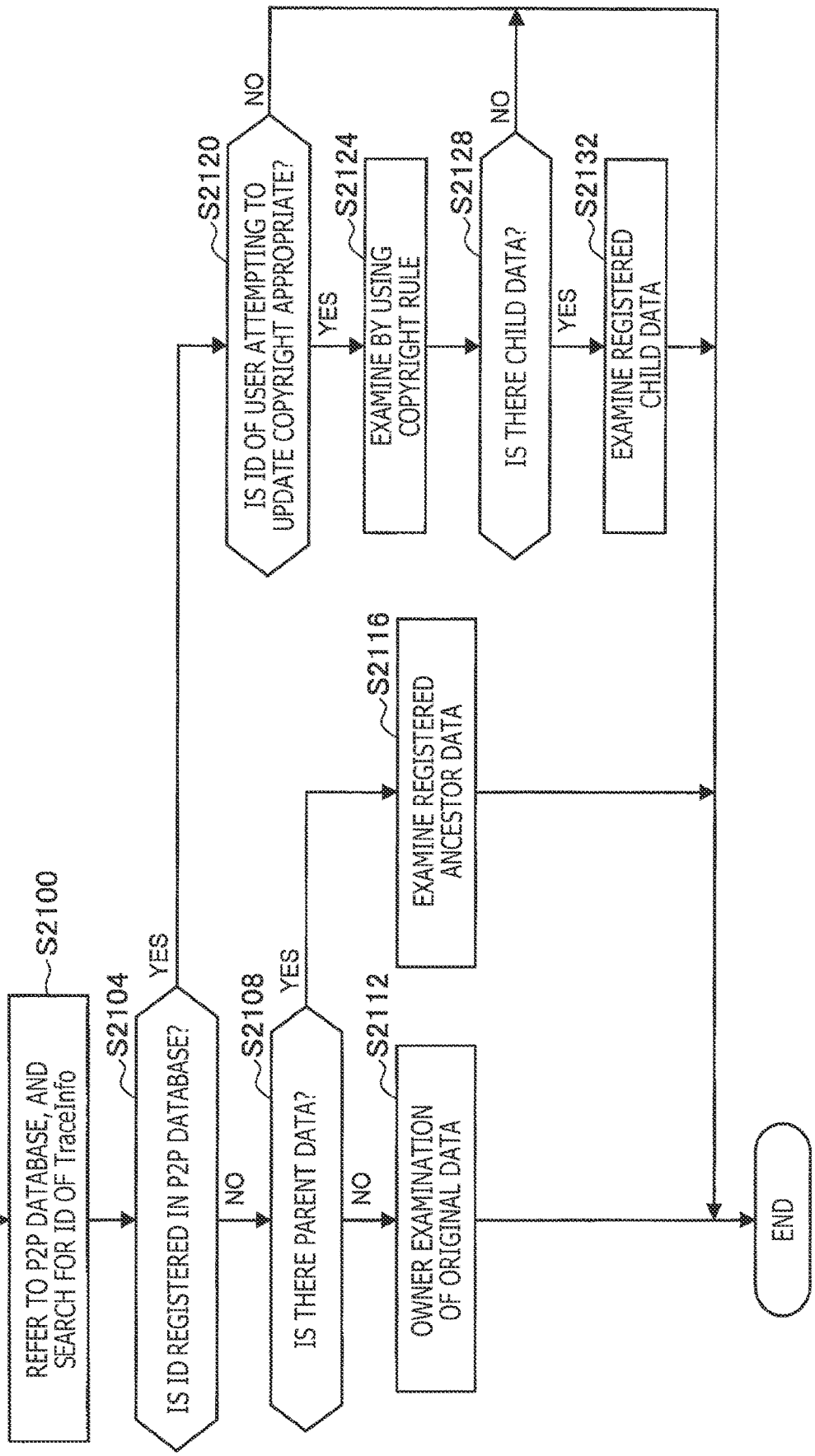
FIG. 31 is a flowchart depicting an example of a flow of a process to examine registered DataRecord (subroutine 2-2) that is performed in FIG. 23.

Next, an examination of registered DataRecord (subroutine 2-2) is explained with reference to FIG. 31. FIG. 31 is a flowchart depicting an example of a flow of the process to examine registered DataRecord, which is performed in FIG. 23.

In Step S2100, the examining section 511a refers to the associative array (dataRecord) in the P2P database 510 and searches for an ID of TraceInfo. In a case that the ID is not registered in the P2P database 510 (Step S2104/No), the examining section 511a checks in Step S2108 whether or not there is parent data of the examination target data (i.e. whether or not the examination target data is original data). In a case that there is no parent data of the examination target data (Step S2108/No), the examining section 511a performs an owner examination of the original data in Step S2112. More specifically, on the basis of ParentsHash included in trace data (Trace Info) of the original data (in a case that the data is the original data, ParentsHash is a hash value of the public key of the generating apparatus 200 and is an identifier of the generating apparatus 200), the examining section 511a examines that the original data is one generated by any of generating apparatuses 200 owned by a user who has made the request, by checking that the identifier of Originator is included in an array OriginatorIDList of UserRecord relevant to UserID specified by a registration request. Then, in a case that the original data is not one generated by any of the generating apparatuses 200 owned by the user, the examining section 511a performs predetermined error handling.

In a case that there is parent data of the examination target data (Step S2108/Yes), the examining section 511a examines registered ancestor data by using TraceInfo of the examination target data in Step S2116. More specifically, the examining section 511a examines whether a copyright that is attempted to be set for the examination target data is stricter (more restricted) than a copyright set for DataRecord of registered ancestor data. Then, in a case that the copyright that is attempted to be set for the examination target data is stricter (more restricted) than the copyright set for DataRecord of the registered ancestor data, the examining section 511a performs predetermined error handling.

In a case that an ID of TraceInfo is registered in the P2P database 510 in Step S2104 (i.e. in a case that a copyright that has already been registered is attempted to be updated; Step S2104/Yes), the examining section 511a examines in Step S2120 whether or not an ID of a user who is attempting to update the copyright is appropriate (i.e. the examining section 511a examines that an identifier of the user who has made the request matches the owner of the data whose copyright is attempted to be updated). More specifically, the examining section 511a checks whether or not ownerID of DataRecord registered in the P2P database 510 (licenseeID in a case that there is a user who is a licensee according to a license agreement) and userID identified by the registration request match. In a case that the ID of the user who is attempting to update the copyright is not appropriate (Step S2120/No), the examining section 511a performs predetermined error handling.

In a case that the ID of the user who is attempting to update the copyright is appropriate (Step S2120/Yes), the examining section 511a performs an examination according to the copyright rule in Step S2124. More specifically, the examining section 511a examines whether or not the update target copyright conforms to the copyright rule (the rule that a copyright stricter (more restricted) than that for parent data cannot be set for child data). In a case that the examination according to the copyright rule is unsuccessful, the examining section 511a performs predetermined error handling.

Thereafter, in Step S2128, on the basis of whether or not information regarding child data of the examination target data is registered in the P2P database 510, the examining section 511a checks whether or not there is child data of the examination target data. In a case that there is child data of the examination target data (Step S2128/Yes), in Step S2132, the examining section 511a refers to childrenIDList of DataRecord of the examination target and examines whether the copyrights of all pieces of registered child data comply with the setting rule. More specifically, the examining section 511a examines whether a copyright that is attempted to be set for the examination target data is not stricter (is less restricted) than the copyrights set for DataRecord of registered child data. Then, in a case that the copyright that is attempted to be set for the examination target data is not stricter (is less restricted) than the copyrights set for the registered child data, the examining section 511a performs predetermined error handling.

6.12. Registration of DataRecord (subroutine 2-3)

Figure 32:
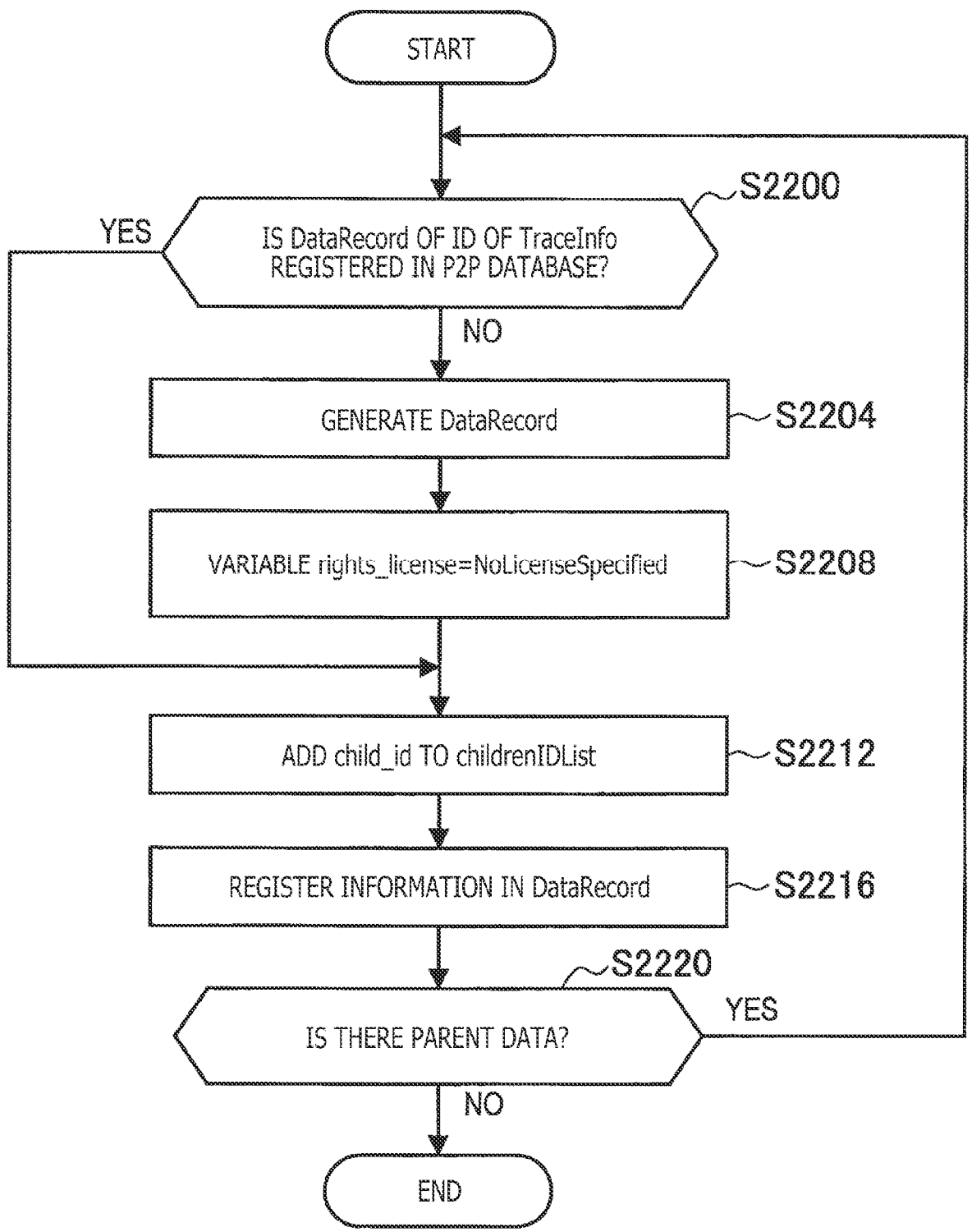
FIG. 32 is a flowchart depicting an example of a flow of a process to register DataRecord (subroutine 2-3) that is performed in FIG. 23.

Next, registration of DataRecord (subroutine 2-3) is explained with reference to FIG. 32. FIG. 32 is a flowchart depicting an example of a flow of the process to register DataRecord, which is performed in FIG. 23.

In Step S2200, the examining section 511a checks whether or not DataRecord having the ID of TraceInfo has been registered in the P2P database 510. In a case that DataRecord having the ID of TraceInfo has not been registered in the P2P database 510 (Step S2200/No), the examining section 511a generates DataRecord in the P2P database 510 in Step S2204. In Step S2208, the examining section 511a sets a variable rights_license to NoLicenseSpecified.

In Step S2212, the examining section 511a adds child_id to childrenIDList. In Step S2216, the examining section 511a registers DataRecord in the associative array (dataRecord) in the P2P database 510. Then, in a case that there is parent data of the registration target data (Step S2220/Yes), the processes in Step S2200 to Step S2216 are repeated (i.e. registration of DataRecord of ancestor data that is continuous with and precedes the registration target data and updating of childrenIDList are performed). Then, in a case that there is no parent data of the registration target data (i.e. after registration of DataRecord of ancestor data that is continuous with and precedes the registration target data and updating of childrenIDList are performed; Step S2220/No), the series of processing ends.

7. Example

In the description above, the process flow example of each apparatus has been explained. Next, an example of the present disclosure is explained. Note that hereinafter a case that the P2P database 510 is a consortium blockchain is explained as an example.

7.1. Registration of Image Data

Figure 33:
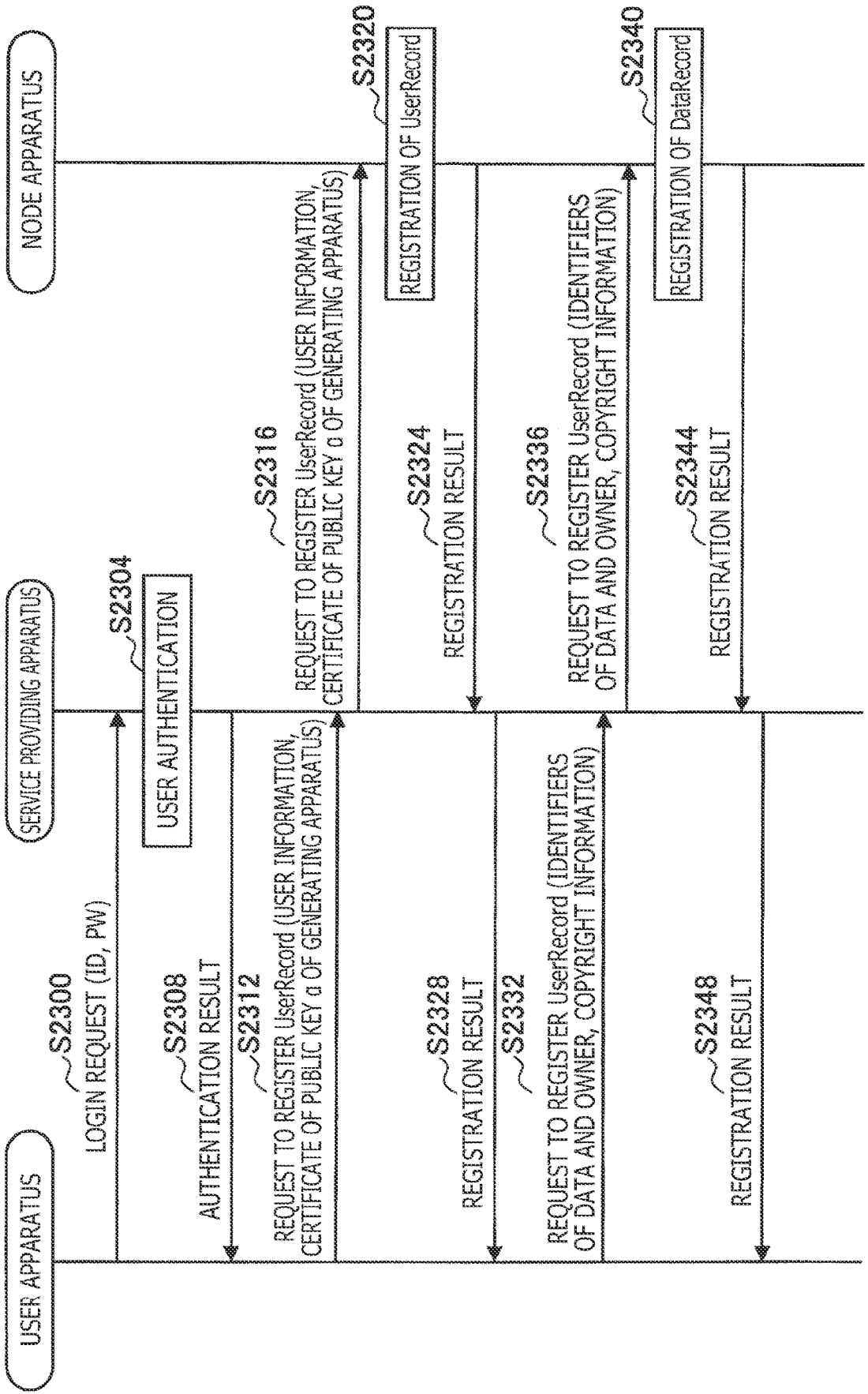
FIG. 33 is a sequence diagram depicting an example of a flow of a process to be performed in a case that the owner of the generating apparatus (a camera, etc.) registers image data in a blockchain by using a manufacturer-provided application.

For example, the owner of the generating apparatus 200 (or the processing apparatus 300) can register image data in a blockchain by using a manufacturer-provided application. In view of this, an example of a flow of a process to be performed in this case is explained with reference to FIG. 33. FIG. 33 is a sequence diagram depicting an example of a flow of a process to be performed in a case that the owner of the generating apparatus 200 registers, in the blockchain, image data by using the manufacturer-provided application. Note that, in addition to the node apparatus 500, a user apparatus and a service providing apparatus are mentioned with reference to FIG. 33. The user apparatus is a certain information processing apparatus operated by a user and can be realized by, for example, the generating apparatus 200 (but certainly is not limited to this). The service providing apparatus, instead of the user, performs Wallet management of the P2P database 510 and can be realized by a server or the like of a manufacturer that provides applications (i.e. services).

In Step S2300, the user apparatus sends, to the service providing apparatus, a login request including an ID and PassWord for login. In Step S2304, the service providing apparatus performs user authentication by comparing the ID and PassWord included in the login request and a preregistered ID and PassWord. In Step S2308, the service providing apparatus sends an authentication result to the user apparatus. In a case that the user authentication is successful, in Step S2312, the user apparatus sends, to the service providing apparatus, a registration request for UserRecord that includes user information (e.g. a name, attributes, etc.), a certificate of the public key a of the generating apparatus 200, and the like. In Step S2316, the service providing apparatus sends the request to the node apparatus 500, as a transaction of an address of Wallet of the authenticated user.

In Step S2320, the node apparatus 500 registers UserRecord in the blockchain. More specifically, the node apparatus 500 registers UserRecord in the blockchain by performing the series of processing depicted in FIG. 22. In Step S2324, the node apparatus 500 sends a registration result to the service providing apparatus. In Step S2328, the service providing apparatus sends the registration result to the user apparatus.

In a case that the registration of UserRecord is successful, in Step S2332, the user apparatus sends, to the service providing apparatus, a registration request for DataRecord that includes image data, an identifier of an owner, copyright information, and the like. In Step S2336, the service providing apparatus sends the request to the node apparatus 500, as a transaction of the address of Wallet of the authenticated user.

In Step S2340, the node apparatus 500 registers DataRecord in the blockchain. More specifically, the node apparatus 500 registers DataRecord in the blockchain by performing the series of processing depicted in FIG. 23. In Step S2344, the node apparatus 500 sends a registration result to the service providing apparatus. In Step S2348, the service providing apparatus sends the registration result to the user apparatus. Then, the series of processing ends. Registration of DataRecord of the image data in the P2P database 510 is realized by the series of processing explained thus far.

7.2. Creation of Certificate Related to Image Data, Etc

Figure 34:
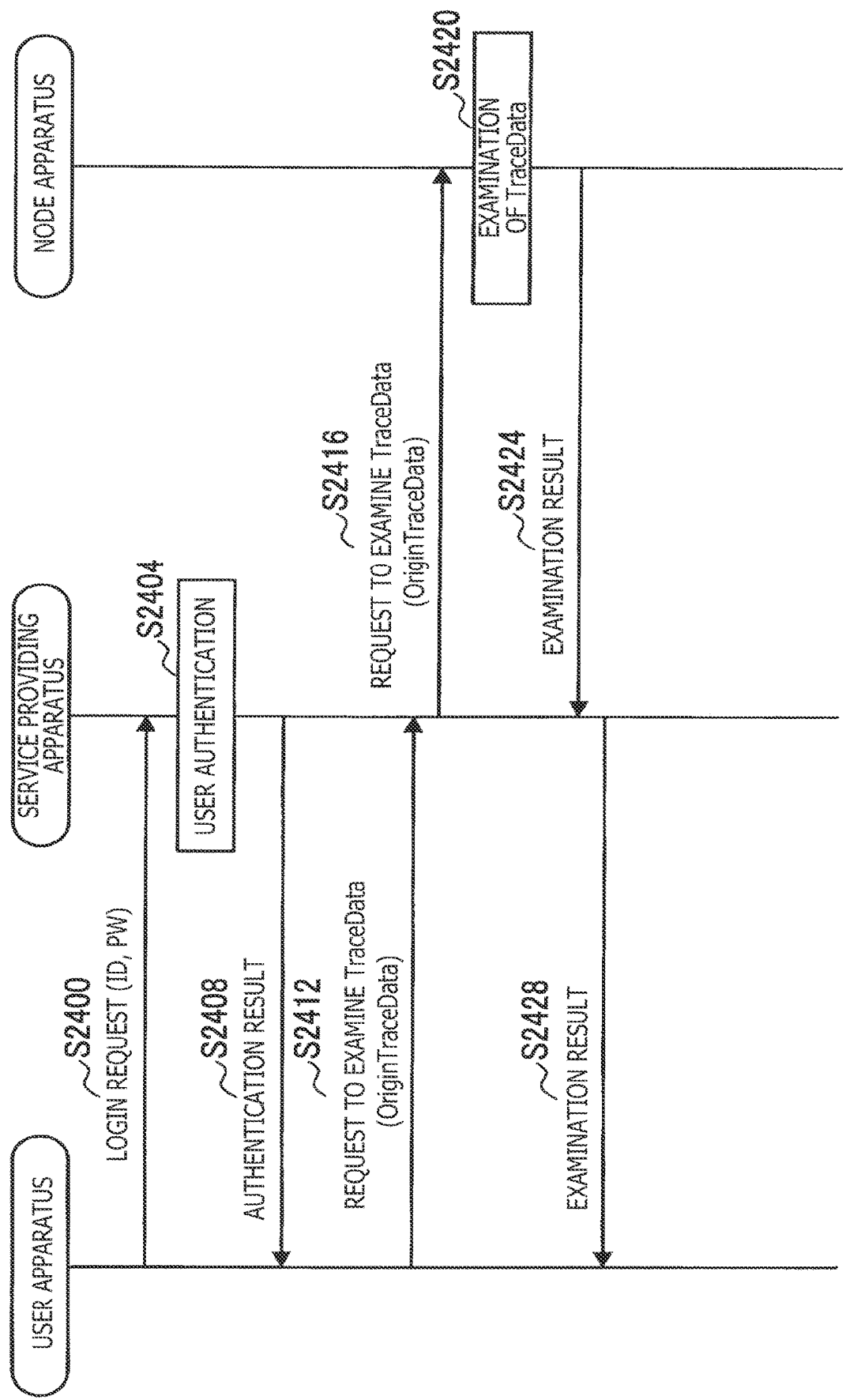
FIG. 34 is a sequence diagram depicting an example of a flow of a process to be performed in a case that a user who has generated image data uses a manufacturer-provided service to create a certificate to certify the authenticity of the image data and shares the certificate with another party.

In addition, a user who has generated image data by using, for example, the generating apparatus 200 (or the processing apparatus 300) can create a certificate to certify the authenticity of the image data, by using a manufacturer-provided service, and share the certificate with another party. In view of this, an example of a flow of a process to be performed in this case is explained with reference to FIG. 34. FIG. 34 is a sequence diagram depicting an example of a flow of a process to be performed in a case that the user who has generated the image data uses the manufacturer-provided service to create a certificate to certify the authenticity of the image data and shares the certificate with another party. Note that a user apparatus in FIG. 34 can be realized by, for example, the examining apparatus 400 (but certainly is not limited to this). The service providing apparatus can be realized by a server or the like of a manufacturer that provides services.

In Step S2400 to Step S2408, the series of processing that is related to the user authentication and explained in Step S2300 to Step S2308 in FIG. 33 is performed. In a case that the user authentication is successful, the user apparatus sends the image data including Origin Trace Data and the like, to the service providing apparatus in Step S2412. In Step S2416, the service providing apparatus checks that a Hash value of DataInfo included in Origin Trace Data matches a hash value of the image data, creates an examination request including the hash value of the data and TraceData from the Hash value of DataInfo, and sends the request to the node apparatus 500, as a transaction of an address of Wallet of the authenticated user.

In Step S2420, the node apparatus 500 examines TraceData by using data registered in the blockchain. More specifically, the node apparatus 500 examines TraceData by performing the series of processing depicted in FIG. 24. In a case that TraceData has been examined, the node apparatus 500 generates a predetermined certificate and sends the certificate to the service providing apparatus, as an examination result in Step S2424. In Step S2428, the service providing apparatus sends the certificate to the user apparatus, as the examination result. Then, the user presents the certificate provided as the examination result, to another party (e.g. a buyer or a viewer of the image data). In addition, the service providing apparatus may present the certificate to another party by disclosing the certificate on a predetermined website or the like. Creation and sharing of the certificate related to the image data are realized by the series of processing explained thus far.

7.3. Reporting of Unauthorized Use of Image Data

Figure 35:
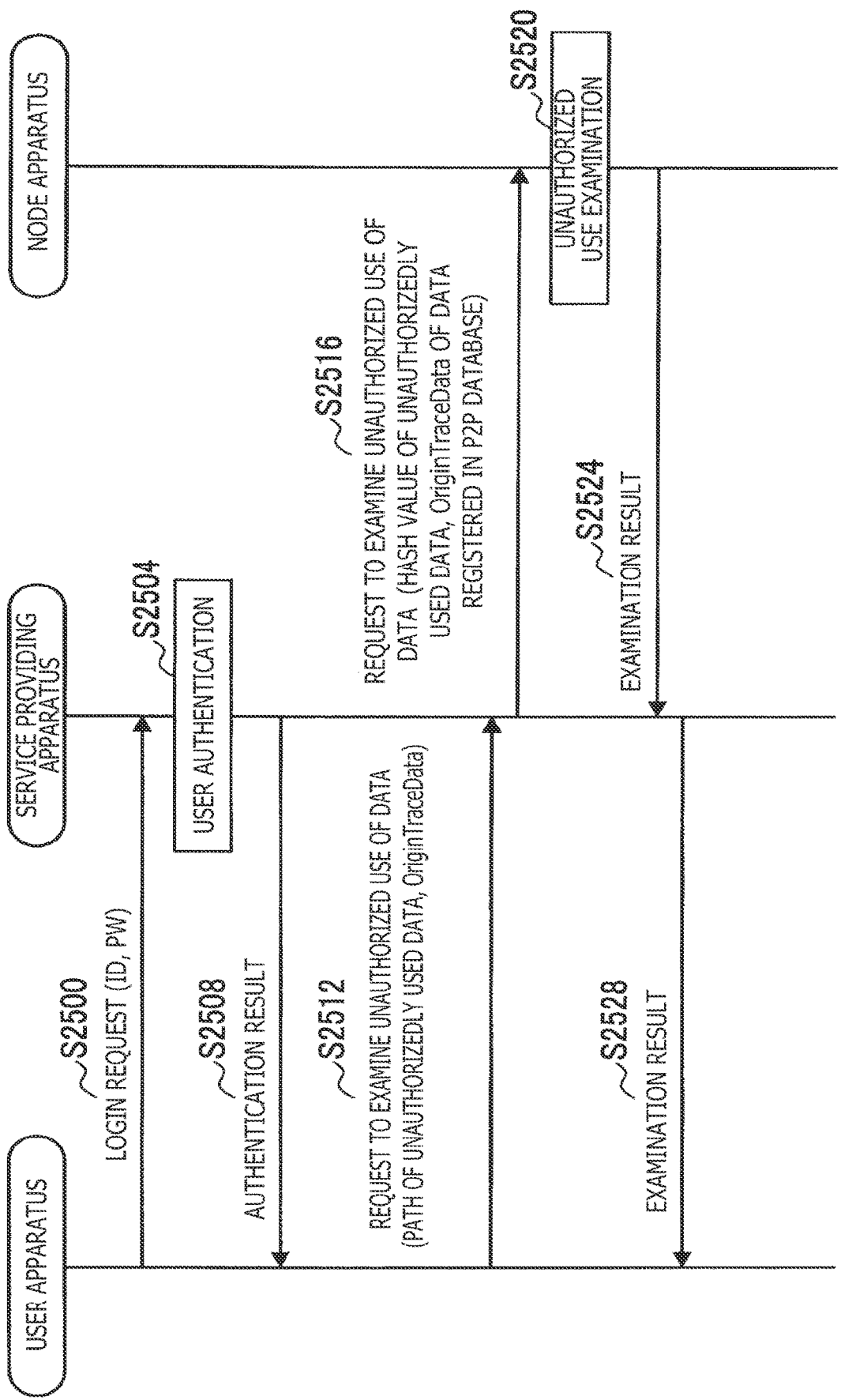
FIG. 35 is a sequence diagram depicting an example of a flow of a process to be performed in a case that a user uses a manufacturer-provided service to create a report for reporting unauthorized use and shares the report with another party.

In addition, in a case that a user who has generated image data finds unauthorized use of the image data by another party (e.g. use against the copyright, forgery of the image data, etc.), the user can create a report for reporting the unauthorized use by using a manufacturer-provided service and share the report with another party. In view of this, an example of a flow of a process to be performed in this case is explained with reference to FIG. 35. FIG. 35 is a sequence diagram depicting an example of a flow of a process to be performed in a case that the user uses the manufacturer-provided service to create a report for reporting the unauthorized use and shares the report with another party. Note that a user apparatus in FIG. 35 can be realized by, for example, the examining apparatus 400 (but certainly is not limited to this). The service providing apparatus can be realized by a server or the like of a manufacturer that provides services.

In Step S2500 to Step S2508, the series of processing that is related to the user authentication and explained in Step S2300 to Step S2308 in FIG. 33 is performed. In a case that the user authentication is successful, in Step S2512, the user apparatus sends, to the service providing apparatus, a data unauthorized use examination request including OriginTraceData and a path (e.g. a URL, etc.) of the data that is being unauthorizedly used. Here, the OriginTraceData is created by the user who has generated the image data, and is registered in the P2P database 510. The service providing apparatus computes a hash value of the image data from the path of the data being unauthorizedly used. After checking that the hash value matches an ID of OriginTraceData, in Step S2516, the service providing apparatus sends, to the node apparatus 500, an examination request including the hash value of the image data being unauthorizedly used and OriginTraceData, as a transaction of an address of Wallet of the authenticated user.

In Step S2520, the node apparatus 500 examines whether or not the data corresponding to OriginTraceData is registered in the blockchain, by using data registered in the blockchain. For example, the node apparatus 500 performs the series of processing depicted in FIG. 24, to thereby examine that the hash value of the image data being unauthorizedly used matches the hash value of OriginTraceData, on the basis of the ID of requested OriginTraceData. Then, on the basis of copyright information obtained as an examination result, the node apparatus 500 checks that the use is authorized use, and in a case that the use is not authorized use, the node apparatus 500 decides that unauthorized use of the image data created by the user is being performed.

In Step S2524, the node apparatus 500 generates a predetermined report and sends the report to the service providing apparatus, as an examination result. In Step S2528, the service providing apparatus sends the report to the user apparatus, as the examination result. Then, the user presents the report provided as the examination result, to another party. In addition, the service providing apparatus may open a Web page including the report, on a predetermined website or the like, and notify the URL to thereby present the report to another party. Reporting of the unauthorized use of the image data is realized by the series of processing explained thus far.

7.4. Purchase of Image Data

Figure 36:
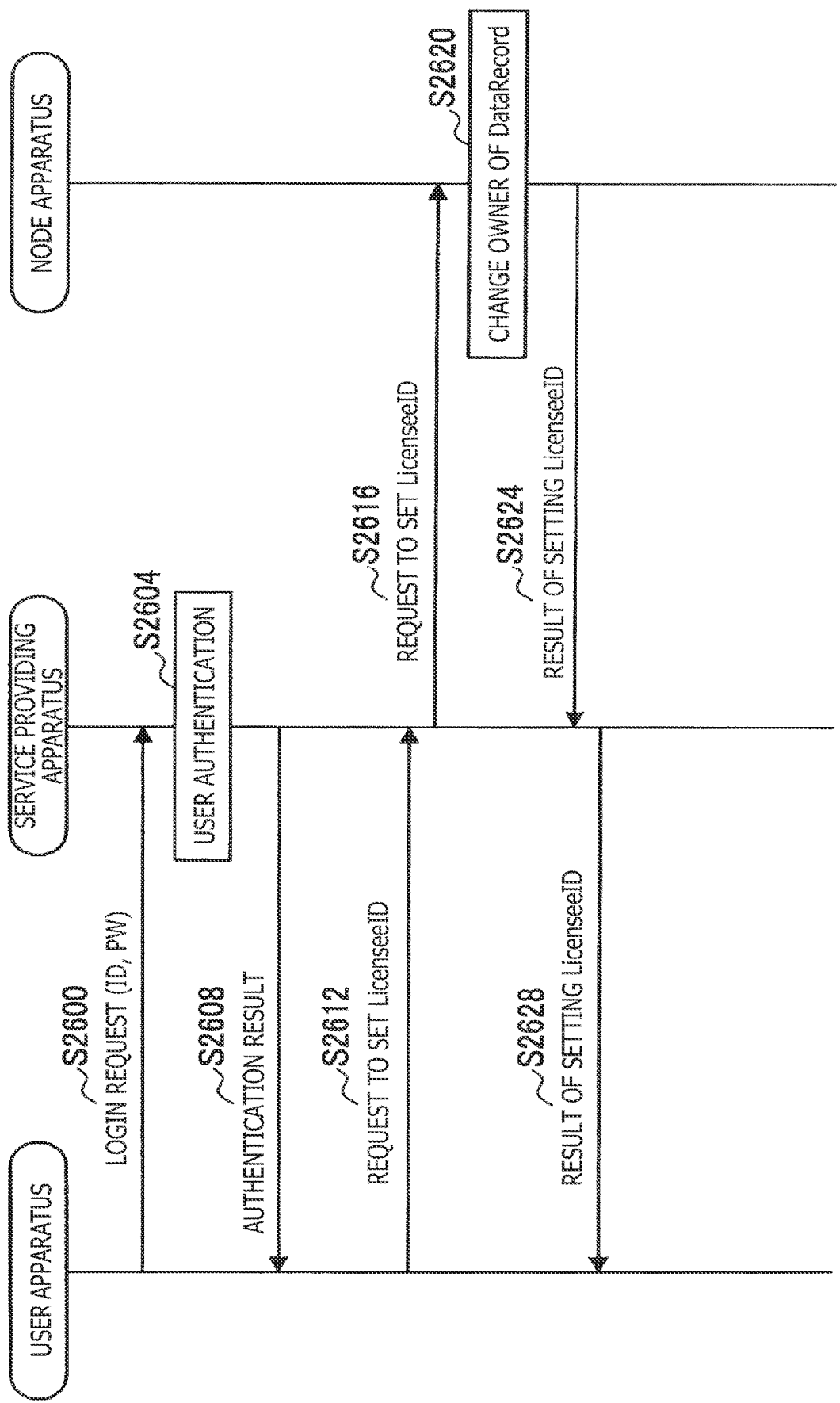
FIG. 36 is a sequence diagram depicting an example of a flow of a process to be performed in a case that a user purchases image data generated by another user.

In addition, for example, a user may purchase image data generated by another user (i.e. may acquire the ownership of the image data from another user). In view of this, an example of a flow of a process to be performed in this case is explained with reference to FIG. 36. FIG. 36 is a sequence diagram depicting an example of a flow of a process to set UserID of a buyer as LicenseeID of data in a case that the user purchases the image data generated by another user. Note that a user apparatus in FIG. 36 can be realized by, for example, the processing apparatus 300 (but certainly is not limited to this). The service providing apparatus can be realized by a server or the like of a manufacturer that provides services.

In Step S2600 to Step S2608, the series of processing that is related to the user authentication and explained in Step S2300 to Step S2308 in FIG. 33 is performed. In a case that the user authentication is successful, in Step S2612, the user apparatus sends, to the service providing apparatus, a request to purchase the image data (a request to set UserID of the buyer as LicenseeID of the image data). It is assumed that, at this time, the buyer has agreed with license conditions presented by the owner of the data in advance and has paid a consideration for the purchase of the image data, and the owner has received a purchase request from the buyer. In Step S2616, on the basis of the request, the service providing apparatus sends a request to change information regarding the owner in data information (DataRecord) registered in the P2P database 510 in association with the purchase target image data, to the node apparatus 500, as a transaction of an address of Wallet of the authenticated user.

In Step S2620, on the basis of the request, the node apparatus 500 changes the information regarding Licensee in the data information (DataRecord) registered in the P2P database 510. More specifically, the node apparatus 500 changes licenseeID in DataRecord (an identifier of a user who is a licensee according to a license agreement) to UserID of the user who intends to purchase the image data. In addition, rightsLicense is changed to AllRightsReserved_UnderAgreements in FIG. 18.

In Step S2624, the node apparatus 500 sends an owner change result (a change result of licenseeID) to the service providing apparatus. In Step S2628, the service providing apparatus sends the owner change result to the user apparatus. Setting of LicenseeID at the time of purchase of image data is realized by the series of processing explained thus far.

8. Hardware Configuration Example of Each Apparatus

Figure 37:
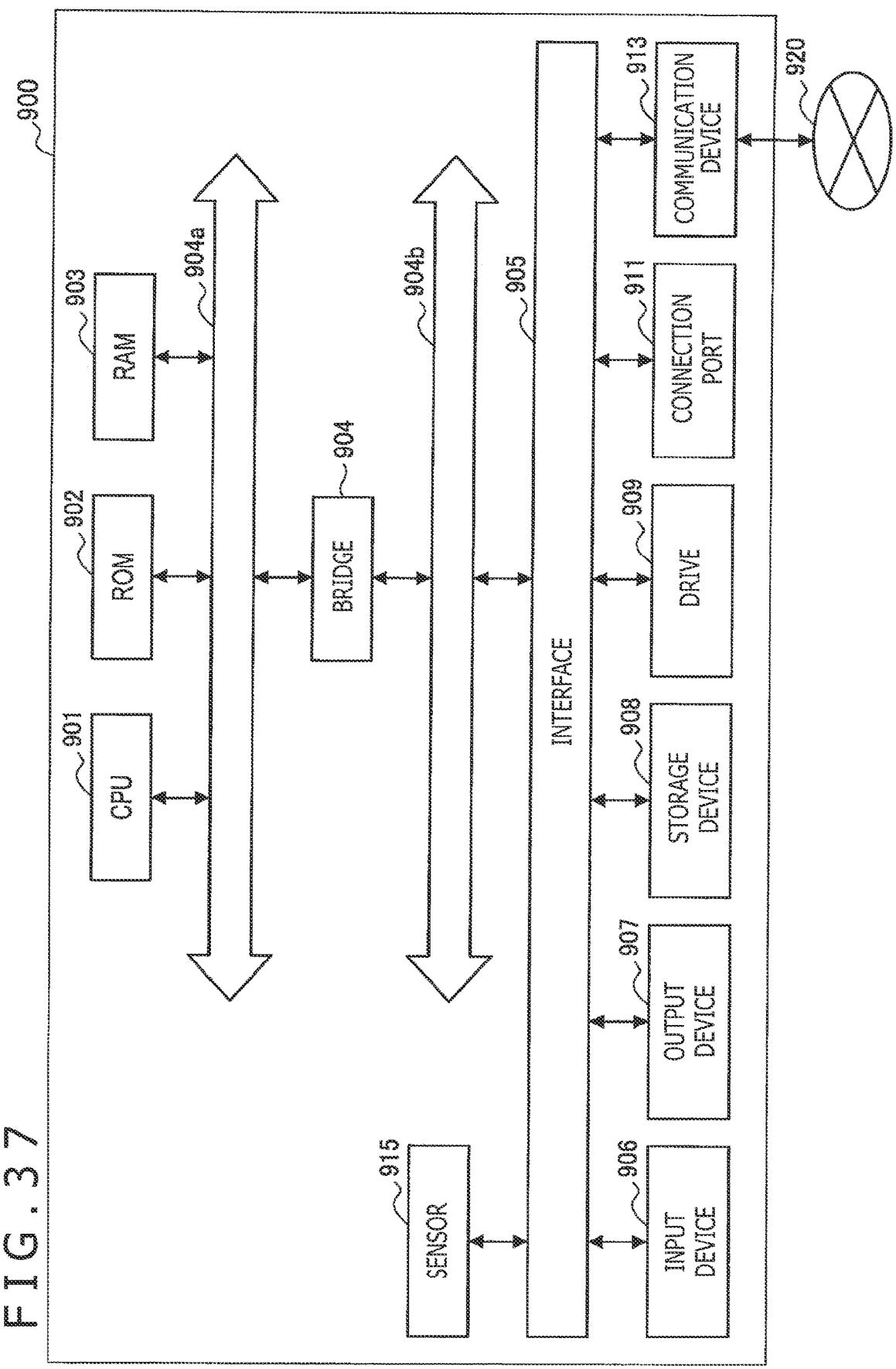
FIG. 37 is a block diagram depicting a hardware configuration example of an information processing apparatus that realizes at least any of the manufacturer apparatus, the generating apparatus, the processing apparatus, the examining apparatus, and the node apparatus according to the present embodiment.

The example of the present disclosure has been explained in the description above. Next, a hardware configuration example of each apparatus according to the present embodiment that is explained thus far in the description above is explained with reference to FIG. 37. FIG. 37 is a block diagram depicting a hardware configuration example of an information processing apparatus 900 that realizes at least any of the manufacturer apparatus 100, the generating apparatus 200, the processing apparatus 300, the examining apparatus 400, and the node apparatus 500 according to the present embodiment. Information processing by each apparatus according to the present embodiment is realized by cooperative operation between software and hardware explained below.

As depicted in FIG. 37, the information processing apparatus 900 includes a CPU (Central Processing Unit) 901, a ROM (Read Only Memory) 902, a RAM (Random Access Memory) 903, and a host bus 904a. In addition, the information processing apparatus 900 includes a bridge 904, an external bus 904b, an interface 905, an input device 906, an output device 907, a storage device 908, a drive 909, a connection port 911, a communication device 913, and a sensor 915. The information processing apparatus 900 may has a processing circuit such as an LSI, a DSP, or an ASIC for encryption calculation, instead of or in addition to the CPU 901.

The CPU 901 functions as a calculation processing unit and a control device and controls the overall operation in the information processing apparatus 900 according to various types of programs. In addition, the CPU 901 may be a microprocessor. The ROM 902 stores programs, calculation parameters, and the like to be used by the CPU 901. The RAM 903 temporarily stores a program to be used in execution of the CPU 901, parameters that change as appropriate in the execution, and the like. The CPU 901 can realize configurations to execute, for example, the data generating section 210, the certificate generating section 220, the key generating section 230, and the trace data processing section 240 of the generating apparatus 200; the data processing section 310, the certificate generating section 320, the key generating section 330, and the trace data processing section 340 of the processing apparatus 300; the examining section 410 and the data similarity deciding section 420 of the examining apparatus 400; and the P2P database program 511 of the node apparatus 500.

The CPU 901, the ROM 902, and RAM 903 are interconnected by the host bus 904a including a CPU bus or the like. The host bus 904a is connected to the external bus 904b such as a PCI (Peripheral Component Interconnect/Interface) bus via the bridge 904. Note that the host bus 904a, the bridge 904, and the external bus 904b need not necessarily be configured separately, and one bus may implement these functions.

For example, the input device 906 is realized by devices through which information is input by a user, such as a mouse, a keyboard, a touch panel, a button, a microphone, a switch, or a lever. In addition, for example, the input device 906 may be a remote control device that uses infrared or other radio waves, or may be externally connected equipment such as a mobile phone or a PDA supporting operation of the information processing apparatus 900. Further, for example, the input device 906 may include an input control circuit or the like that generates an input signal on the basis of information input by a user by using the input means described above and outputs the input signal to the CPU 901. By operating the input device 906, the user of the information processing apparatus 900 can input various types of data to the information processing apparatus 900 and give instructions regarding process operation.

The output device 907 includes a device that can notify acquired information to a user visually or by sounds. Examples of such a device include a display device such as a CRT display device, a liquid crystal display device, a plasma display device, an EL display device, or a lamp, an audio output device such as a speaker or headphones, and a printer device.

The storage device 908 is a device for data storage that is formed as an example of a storage section of the information processing apparatus 900. For example, the storage device 908 is realized by a magnetic storage section device such as an HDD, a semiconductor storage device, an optical storage device, a magneto-optical storage device, or the like. The storage device 908 may include a storage medium, a recording device that records data on a storage medium, a reading device that reads out data from a storage medium, a deleting device that deletes data recorded on a storage medium, and the like. The storage device 908 stores programs to be executed by the CPU 901, various types of data, various types of data acquired externally, and the like. For example, the storage device 908 can realize the storage section 110 of the manufacturer apparatus 100, the storage section 250 of the generating apparatus 200, and the P2P database 510 of the node apparatus 500.

The drive 909 is a reader/writer for storage media, and is built in the information processing apparatus 900 or is externally attached to the information processing apparatus 900. The drive 909 reads out information recorded on an attached removable storage medium such as a magnetic disk, an optical disk, a magneto-optical disk, or a semiconductor memory, and outputs the information to the RAM 903. In addition, the drive 909 can also write information on a removable storage medium.

The connection port 911 is an interface connected with external equipment and is, for example, a port for connection with external equipment through which data can be transferred by USB (Universal Serial Bus) or the like.

For example, the communication device 913 is a communication interface including a communication device or the like for connection to a network 920. For example, the communication device 913 is a communication card or the like for wired or wireless LAN (Local Area Network), LTE (Long Term Evolution), Bluetooth (registered trademark), or WUSB (Wireless USB). In addition, the communication device 913 may be an optical communication router, an ADSL (Asymmetric Digital Subscriber Line) router, various types of communication modems, or the like. For example, the communication device 913 can send and receive signals or the like to and from the Internet or other communication equipment while conforming to a predetermined protocol such as TCP/IP.

For example, the sensor 915 includes various types of sensors such as an imaging sensor, a pressure sensor, an acceleration sensor, a gyro sensor, a geomagnetic sensor, a light sensor, a sound sensor, or a distance measurement sensor. In a case that the generating apparatus 200 is a camera in the present embodiment, the sensor 915 can realize an imaging sensor of the generating apparatus 200.

Note that the network 920 is a wired or wireless transfer path for information sent from apparatuses connected to the network 920. For example, the network 920 may include public networks such as the Internet, a telephone network, or a satellite communication network, various types of LAN (Local Area Network) and WAN (Wide Area Network) including Ethernet (registered trademark), and the like. In addition, the network 920 may include a dedicated network such as IP-VPN (Internet Protocol-Virtual Private Network).

The hardware configuration example of each apparatus according to the present embodiment has been depicted thus far. Each constituent element in the description above may be realized by using a generally-used member or may be realized by hardware specialized for the function of each constituent element. Accordingly, the hardware configuration to be used can be changed as appropriate according to the technology level of the very time when the present embodiment is implemented.

Note that it is possible to fabricate a computer program for realizing respective functions of the information processing apparatus 900 described above and implement the computer program on a PC or the like. In addition, a computer-readable recording medium on which such a computer program is stored can also be provided. The recording medium is, for example, a magnetic disk, an optical disk, a magneto-optical disk, a flash memory, or the like. In addition, the computer program described above may be distributed via a network, for example, without using a recording medium.

While the suitable embodiment of the present disclosure is explained in detail with reference to the attached figures thus far, the technical scope of the present disclosure is not limited to the example. It is obvious that it is possible for those with ordinary knowledge in the technical field of the present disclosure to conceive of various types of altered examples or corrected examples within the scope of the technical idea described in claims, and those various types of altered examples or corrected examples are understood to belong to the technical scope of the present disclosure certainly.

In addition, the advantages described in the present specification are presented merely for explanation or illustration but not for limitation. That is, the technology according to the present disclosure can exhibit other advantages that are obvious for those skilled in the art from the description of the present specification, along with the advantages described above or instead of the advantages described above.

Note that configurations mentioned below also belong to the technical scope of the present disclosure.

(1)

An information processing apparatus including:
a key generating section that generates a public key and a private key of second data generated on the basis of at least one or more pieces of first data;
a certificate generating section that generates a certificate by using a private key of the first data to give an electronic signature to
the public key of the second data or an ID that is generated by using the public key of the second data and is capable of identifying the public key of the second data, and
the second data or data generated from the second data; and
a trace data processing section that adds, to the second data, the private key of the second data and trace data to be used for tracing a relation between the first data and the second data, in which
the trace data includes the certificate generated by the certificate generating section and trace data added to the first data.

(2)

The information processing apparatus according to (1), in which the trace data processing section adds, to the trace data, an ID that is capable of identifying the second data, the ID being generated by performing a calculation according to a cryptographic hash function by using at least the second data, the public key of the second data, and IDs that are capable of identifying all pieces of the first data.

(3)

The information processing apparatus according to (1) or (2), in which
the trace data processing section associates digest information representing details of the second data, with the trace data, and
the certificate generating section includes, in the certificate, as a certification target, an ID that is capable of identifying the digest information, the ID being generated by performing a calculation according to a cryptographic hash function by using the digest information.

(4)

A program causing a computer to implement:
generating a public key and a private key of second data generated on the basis of at least one or more pieces of first data;
generating a certificate by using a private key of the first data to give an electronic signature to
the public key of the second data or an ID that is generated by using the public key of the second data and is capable of identifying the public key of the second data, and
the second data or data generated from the second data; and
adding, to the second data, the private key of the second data and trace data to be used for tracing a relation between the first data and the second data, in which
the trace data includes the certificate and trace data added to the first data.

(5)

An information processing apparatus including:
a data generating section that generates data;
a key generating section that generates a public key and a private key of the data;
a certificate generating section that generates a certificate by using a private key of the information processing apparatus to give an electronic signature to
the public key of the data or an ID that is generated by using the public key of the data and is capable of identifying the public key of the data, and
the data or data generated from the data; and
a trace data processing section that adds, to the data, the private key of the data and trace data that is to be used for tracing generation of the data by the information processing apparatus and includes the certificate generated by the certificate generating section.

(6)

The information processing apparatus according to (5), in which the trace data processing section adds, to the trace data, an ID that is capable of identifying the data, the ID being generated by performing a calculation according to a cryptographic hash function by using at least the data, the public key of the data, a public key of the information processing apparatus.

(7)

The information processing apparatus according to (5) or (6), in which
the trace data processing section associates digest information representing details of the data, with the trace data, and
the certificate generating section includes, in the certificate, as a certification target, an ID that is capable of identifying the digest information, the ID being generated by performing a calculation according to a cryptographic hash function by using the digest information.

(8)

The information processing apparatus according to any one of (5) to (7), in which a certificate, a public key of the information processing apparatus, or an identifier of the public key of the information processing apparatus is registered in a P2P database, the certificate being generated by using a private key of a manufacturer of the information processing apparatus to give an electronic signature to the public key of the information processing apparatus or the identifier of the public key of the information processing apparatus.

(9)

The information processing apparatus according to (8), in which a certificate generated by using the private key of the manufacturer to give an electronic signature to a public key of the manufacturer is registered in the P2P database.

(10)

An information processing apparatus including:
an examining section that uses trace data and information registered in a database, the trace data being used for tracing a relation between at least one or more pieces of first data and second data generated on the basis of the first data and being added to the second data, to thereby examine authenticity of the second data or data generated from the second data; and
a registering section that registers, in the database, the second data or an ID that is capable of identifying the second data, in which
the trace data includes a certificate and trace data added to the first data,
the certificate being generated by using a private key of the first data to give an electronic signature to
a public key of the second data or an ID that is generated by using the public key of the second data and is capable of identifying the public key of the second data, and
the second data or the data generated from the second data.

(11)

The information processing apparatus according to (10), in which
the examining section
examines the certificate of the second data that is included in the trace data and provided with the electronic signature by using the private key of the first data, by using a public key of the first data that is included in the trace data added to the first data or an ID that is generated by using the public key of the first data and is capable of identifying the public key of the first data, and
examines that an ID that is generated by performing a calculation according to a cryptographic hash function by using at least the second data, the public key of the second data, and IDs that are capable of identifying all pieces of the first data and is capable of identifying the second data matches an ID that is included in the trace data and is capable of identifying the second data.

(12)

The information processing apparatus according to (11), in which
data to be treated as the second data is also treated as the first data, so that those pieces of data have a chain-like relation,
for an examination of a certificate included in the trace data of foremost data in the chain-like relation, the examining section uses a public key of a generating apparatus of the foremost data that is registered in the database, or an ID that is generated by using the public key of the generating apparatus and is capable of identifying the public key of the generating apparatus, and
the public key of the generating apparatus is examined according to a certificate provided with an electronic signature by using a private key of a manufacturer and is registered in the database.

(13)

The information processing apparatus according to (12), in which, after the examination of the certificate by the examining section, the registering section registers, in the database, an ID that is capable of identifying the second data or an ID that is included in the trace data and is capable of identifying each piece of data.

(14)

The information processing apparatus according to any one of (10) to (13), in which
the database includes a P2P database, and
the examining section is provided in the P2P database and is realized by a predetermined program executed on the P2P database.

(15)

An information processing method executed by a computer, the information processing method including:
using trace data and information registered in a database, the trace data being used for tracing a relation between at least one or more pieces of first data and second data generated on the basis of the first data and being added to the second data, to thereby examine authenticity of the second data or data generated from the second data; and
registering, in the database, the second data or an ID that is capable of identifying the second data, in which
the trace data includes a certificate and trace data added to the first data,
the certificate being generated by using a private key of the first data to give an electronic signature to
a public key of the second data or an ID that is generated by using the public key of the second data and is capable of identifying the public key of the second data, and
the second data or the data generated from the second data.

(16)

A program that provides an external apparatus with trace data that is used for tracing a relation between at least one or more pieces of first data and second data generated on the basis of the first data and is added to the second data, the external apparatus being configured to examine authenticity of the second data or data generated from the second data, by using the trace data and information registered in a database, the program causing a computer to realize:
a configuration that the trace data includes a certificate and trace data added to the first data,
the certificate being generated by using a private key of the first data to give an electronic signature to
a public key of the second data or an ID that is generated by using the public key of the second data and is capable of identifying the public key of the second data, and
the second data or the data generated from the second data.

REFERENCE SIGNS LIST

100: Manufacturer apparatus
110: Storage section
200: Generating apparatus
210: Data generating section
220: Certificate generating section
230: Key generating section
240: Trace data processing section
250: Storage section
300: Processing apparatus
310: Data processing section
320: Certificate generating section
330: Key generating section
340: Trace data processing section
400: Examining apparatus
410: Examining section
420: Data similarity deciding section
500: Node apparatus
510: P2P database
511: P2P database program
511a: Examining section (registering section)
600: P2P network

The invention claimed is:

1. An information processing apparatus comprising:
a key generating section that generates a public key and a private key of second data generated on a basis of at least one or more pieces of first data;
a certificate generating section that generates a certificate by using a private key of the first data to give an electronic signature to
the public key of the second data or an ID that is generated by using the public key of the second data and is capable of identifying the public key of the second data, and
the second data or data generated from the second data; and
a trace data processing section that adds, to the second data, the private key of the second data and trace data to be used for tracing a relation between the first data and the second data, wherein
the trace data includes the certificate generated by the certificate generating section and trace data added to the first data.

2. The information processing apparatus according to claim 1, wherein the trace data processing section adds, to the trace data, an ID that is capable of identifying the second data, the ID being generated by performing a calculation according to a cryptographic hash function by using at least the second data, the public key of the second data, and IDs that are capable of identifying all pieces of the first data.

3. The information processing apparatus according to claim 1, wherein the trace data processing section associates digest information representing details of the second data, with the trace data, and
the certificate generating section includes, in the certificate, as a certification target, an ID that is capable of identifying the digest information, the ID being generated by performing a calculation according to a cryptographic hash function by using the digest information.

4. A program causing a computer to implement:
generating a public key and a private key of second data generated on a basis of at least one or more pieces of first data;
generating a certificate by using a private key of the first data to give an electronic signature to
the public key of the second data or an ID that is generated by using the public key of the second data and is capable of identifying the public key of the second data, and
the second data or data generated from the second data; and
adding, to the second data, the private key of the second data and trace data to be used for tracing a relation between the first data and the second data, wherein
the trace data includes the certificate and trace data added to the first data.

5. An information processing apparatus comprising:
a data generating section that generates data;
a key generating section that generates a public key and a private key of the data;
a certificate generating section that generates a certificate by using a private key of the information processing apparatus to give an electronic signature to
the public key of the data or an ID that is generated by using the public key of the data and is capable of identifying the public key of the data, and
the data or data generated from the data; and
a trace data processing section that adds, to the data, the private key of the data and trace data that is to be used for tracing generation of the data by the information processing apparatus and includes the certificate generated by the certificate generating section.

6. The information processing apparatus according to claim 5, wherein the trace data processing section adds, to the trace data, an ID that is capable of identifying the data, the ID being generated by performing a calculation according to a cryptographic hash function by using at least the data, the public key of the data, a public key of the information processing apparatus.

7. The information processing apparatus according to claim 5, wherein
the trace data processing section associates digest information representing details of the data, with the trace data, and
the certificate generating section includes, in the certificate, as a certification target, an ID that is capable of identifying the digest information, the ID being generated by performing a calculation according to a cryptographic hash function by using the digest information.

8. The information processing apparatus according to claim 5, wherein a certificate, a public key of the information processing apparatus, or an identifier of the public key of the information processing apparatus is registered in a P2P database, the certificate being generated by using a private key of a manufacturer of the information processing apparatus to give an electronic signature to the public key of the information processing apparatus or the identifier of the public key of the information processing apparatus.

9. The information processing apparatus according to claim 8, wherein a certificate generated by using the private key of the manufacturer to give an electronic signature to a public key of the manufacturer is registered in the P2P database.

10. An information processing apparatus comprising:
an examining section that uses trace data and information registered in a database, the trace data being used for tracing a relation between at least one or more pieces of first data and second data generated on a basis of the first data and being added to the second data, to thereby examine authenticity of the second data or data generated from the second data; and
a registering section that registers, in the database, the second data or an ID that is capable of identifying the second data, wherein
the trace data includes a certificate and trace data added to the first data,
the certificate being generated by using a private key of the first data to give an electronic signature to
a public key of the second data or an ID that is generated by using the public key of the second data and is capable of identifying the public key of the second data, and
the second data or the data generated from the second data.

11. The information processing apparatus according to claim 10, wherein
the examining section
examines the certificate of the second data that is included in the trace data and provided with the electronic signature by using the private key of the first data, by using a public key of the first data that is included in the trace data added to the first data or an ID that is generated by using the public key of the first data and is capable of identifying the public key of the first data, and
examines that an ID that is generated by performing a calculation according to a cryptographic hash function by using at least the second data, the public key of the second data, and IDs that are capable of identifying all pieces of the first data and is capable of identifying the second data matches an ID that is included in the trace data and is capable of identifying the second data.

12. The information processing apparatus according to claim 11, wherein
data to be treated as the second data is also treated as the first data, so that those pieces of data have a chain-like relation,
for an examination of a certificate included in the trace data of foremost data in the chain-like relation, the examining section uses a public key of a generating apparatus of the foremost data that is registered in the database, or an ID that is generated by using the public key of the generating apparatus and is capable of identifying the public key of the generating apparatus, and
the public key of the generating apparatus is examined according to a certificate provided with an electronic signature by using a private key of a manufacturer and is registered in the database.

13. The information processing apparatus according to claim 12, wherein, after the examination of the certificate by the examining section, the registering section registers, in the database, an ID that is capable of identifying the second data or an ID that is included in the trace data and is capable of identifying each piece of data.

14. The information processing apparatus according to claim 10, wherein
the database includes a P2P database, and
the examining section is provided in the P2P database and is realized by a predetermined program executed on the P2P database.

15. An information processing method executed by a computer, the information processing method comprising:
using trace data and information registered in a database, the trace data being used for tracing a relation between at least one or more pieces of first data and second data generated on a basis of the first data and being added to the second data, to thereby examine authenticity of the second data or data generated from the second data; and
registering, in the database, the second data or an ID that is capable of identifying the second data, wherein
the trace data includes a certificate and trace data added to the first data,
the certificate being generated by using a private key of the first data to give an electronic signature to
a public key of the second data or an ID that is generated by using the public key of the second data and is capable of identifying the public key of the second data, and
the second data or the data generated from the second data.

16. A program that provides an external apparatus with trace data that is used for tracing a relation between at least one or more pieces of first data and second data generated on a basis of the first data and is added to the second data, the external apparatus being configured to examine authenticity of the second data or data generated from the second data, by using the trace data and information registered in a database, the program causing a computer to realize:
a configuration that the trace data includes a certificate and trace data added to the first data,
the certificate being generated by using a private key of the first data to give an electronic signature to
a public key of the second data or an ID that is generated by using the public key of the second data and is capable of identifying the public key of the second data, and
the second data or the data generated from the second data.

* * * * *